United States Patent
Yoshikawa

(10) Patent No.: US 6,651,805 B2
(45) Date of Patent: Nov. 25, 2003

(54) HIGH-GRADIENT HIGH-PUMP-HEAD SCREW CONVEYOR DEVICE

(75) Inventor: Tadao Yoshikawa, Osaka (JP)

(73) Assignee: Hitachi Zosen Corporation (JP)

( * ) Notice: Subject to any disclaimer, the term of this patent is extended or adjusted under 35 U.S.C. 154(b) by 22 days.

(21) Appl. No.: 10/049,119

(22) PCT Filed: Jun. 11, 2001

(86) PCT No.: PCT/JP01/04925
§ 371 (c)(1),
(2), (4) Date: Feb. 8, 2002

(87) PCT Pub. No.: WO02/00532
PCT Pub. Date: Jan. 3, 2002

(65) Prior Publication Data
US 2002/0104739 A1 Aug. 8, 2002

(30) Foreign Application Priority Data

Jun. 27, 2000 (JP) .......................................... 2000-191956
Feb. 22, 2001 (JP) .......................................... 2001-045879
Apr. 3, 2001 (JP) .......................................... 2001-104014

(51) Int. Cl.⁷ ............................................. B65B 33/26
(52) U.S. Cl. ...................................................... 198/676
(58) Field of Search ................................. 198/673, 674, 198/676, 677, 509, 511, 518; 414/140.7, 133

(56) References Cited

U.S. PATENT DOCUMENTS 5,676,827 A * 10/1997 Bruke .......................... 198/676
5,875,882 A * 3/1999 Pollock ....................... 198/674

FOREIGN PATENT DOCUMENTS

| JP | 58-69056 | 5/1983 |
| JP | 59-73497 | 4/1984 |
| JP | 2-168008 | 6/1990 |
| JP | 40-10893 | 2/1992 |
| JP | 7-223717 | 8/1995 |
| JP | 11-180532 A | 7/1999 |

* cited by examiner

Primary Examiner—Joseph E. Valenza
(74) Attorney, Agent, or Firm—Mark Kusner; Michael A. Jaffe

(57) ABSTRACT

A screw conveyor apparatus including a ribbon screw (4) provided in a cylindrical casing (1). The ribbon screw (4) has rotation rings (12) attached to an intermediate portion thereof. Outer peripheral supporting sections (11) are provided for rotatably supporting the corresponding rotation rings (12) on the casing (1). This configuration prevents the ribbon screw (4) from being bent or expanded under a load of conveyed materials, thereby enabling the materials to be conveyed along a steep slope up to a high portion.

9 Claims, 20 Drawing Sheets

HIGH-GRADIENT HIGH-PUMP-HEAD SCREW CONVEYOR DEVICE

TECHNICAL FIELD

The present invention relates to a screw conveyor apparatus for a steep slope and large lifting height which conveys plastic materials such as sediments or ores, or grains or scattered materials along a steep slope up to a high position.

BACKGROUND ART

As a well-known technique, the inventor of this invention has proposed, for example, in Japanese Patent Publication No. 60-43518 specification, a screw conveyor that conveys grains, scattered materials, or sediments along a steep slope (within the range between 30 and 90°) during an operation of unloading containers from a hold or exhausting sediments from a tunnel shaft. This screw conveyor comprises a cylindrical casing in which a ribbon screw is rotated and supported at its top and has a hollow portion with a central shaft located therein. The term "ribbon screw", as used herein, refers to a helical twisted strip that does not have a central shaft or support spokes.

However, with the above described configuration, if the slope is very steep (30 to 90° from the horizontal line) and the lifting height is about 20 or more times as large as the outer diameter of the screw, the weight of conveyed materials becomes so large that the ribbon screw may be expanded in the axial direction or the conveyed materials are caught in the gap between the ribbon screw and the central shaft or between the ribbon screw and the cylindrical casing. As a result, the ribbon screw may be twisted and bent and further expanded and contracted in the axial direction, thereby reducing the conveying capability of the conveyor to prevent the conveyed materials from being conveyed smoothly.

To prevent this, it is contemplated that the thickness of the ribbon screw may be increased. However, increasing the thickness has the disadvantage of increasing the weight of the ribbon screw, resulting in the need for a high drive force and an increase in manufacture costs.

Further, to increase the lifting height, the screw conveyor may be composed of a plurality of stages connected together via screw overlapping portions so that the axis of the screw is offset between the stages. However, in this case, transfer resistance may occur in the screw overlapping portions to stall conveyed materials.

It is thus an object of the present invention to provide a screw conveyor apparatus for a steep slope and large lifting height which can efficiently convey materials while preventing the ribbon screw from being bent or expanded or contracted even with a steep slope or a large lifting height, without any need to increase the thickness of the ribbon screw.

DISCLOSURE OF INVENTION

The present invention set forth in claim 1 is a screw conveyor apparatus for a steep slope and large lifting height, having a ribbon screw disposed in a cylindrical casing so as to be rotatable around an axis of the ribbon screw, characterized by comprising: rotation rings fixedly fitted over the ribbon screw at predetermined positions in an axial direction of the ribbon screw; and outer peripheral supporting sections provided in the casing and supporting the rotation rings so that the rotation rings to be rotatable.

With the above described configuration, the ribbon screw is supported by the casing via the outer peripheral supporting sections. Accordingly, even if conveyed materials are caught in a gap between the ribbon screw and the casing or if a load heavier than the conveyed materials is imposed on the ribbon screw, the ribbon screw is prevented from being twisted, bent, deformed, or expanded or contracted in the axial direction, thereby restricting a decrease in conveyance efficiency.

The present invention set forth in claim 2 is a screw conveyor apparatus for a steep slope and large lifting height, having a ribbon screw disposed in a cylindrical casing so as to be rotatable around an axis of the ribbon screw, characterized by comprising: rotation rings fixedly fitted over the ribbon screw at predetermined positions in an axial direction; outer peripheral supporting sections provided in the casing to support the rotation rings to be rotatable; a main screw rotating device provided at a predetermined position of the casing to rotationally drive the ribbon screw; and an auxiliary screw rotating device provided for at least one of the outer peripheral supporting sections to rotationally drive the ribbon screw via the rotation rings.

With the above described configuration, the main screw rotating device can rotationally drive the ribbon screw, and the auxiliary screw rotating device can apply, in an intermediate portion of the casing, a rotational drive force to the ribbon screw via the outer peripheral supporting sections. Consequently, the support of the rotation of the ribbon screw can be separated from the transmission of drive force, thereby preventing the ribbon screw from being twisted, bent, deformed, or expanded or contracted, while allowing the screw to be rotationally driven smoothly even with a large lifting height.

The present invention set forth in claim 3 is the screw conveyor apparatus according to claim 1 or 2, characterized in that the ribbon screw is formed by connecting a plurality of screw pieces together in the axial direction, the screw pieces each have a recess and a projection formed at respective connected ends thereof, the recess and projection being capable of engaging with each other in a screw surface so that the screw pieces can be freely coupled together and separated from each other, and coupling members are provided for coupling the screw pieces together using the recesses and projections.

With the above described configuration, the plurality of screw pieces are connected together to form a longer ribbon screw, thereby easily providing a screw conveyor with a large lifting height. Further, the connected ends of the screw pieces are connected together using the coupling members by engaging the recesses and projections with each other, thus allowing the screw pieces to be easily and firmly connected together.

The present invention set forth in claim 4 is the screw conveyor apparatus according to claim 1 or 2, characterized in that the ribbon screw is formed by connecting a plurality of screw pieces together in the axial direction, the screw pieces having connected ends each cut at a traverse surface perpendicular to the axis, with connection rings fixedly fitted over the respective cut portions, the connection rings are connected together to connect the screw pieces together, and integrated connection rings obtained by coupling the connection rings together form outer peripheral supporting sections supported by the casing to be rotatable around the axis so as to support the ribbon screw on the casing.

With the above described configuration, the integraged connection rings connecting the screw pieces together are rotatably supported by the casing to reinforce the connected portions of the screw pieces of which strength is prone to decrease, thereby effectively preventing the screw from being twisted, bent, or expanded or contracted in the axial direction. Further, a longer ribbon screw can be easily formed, and it is possible to convey materials up to a high position.

The present invention set forth in claim 5 is the screw conveyor apparatus according to claim 1 or 2, characterized in that the ribbon screw is formed by connecting a plurality of screw pieces together in the axial direction via coupling pieces, the coupling pieces are fixed to the rotation rings via coupling means, a recess and a projection are formed in ends of the coupling pieces and in connected ends of the screw pieces, the recess and projection being capable of engaging with each other in a screw surface, and the screw pieces and the coupling pieces are continuously connected together along the screw surface at a same inclination.

With the above described configuration, the plurality of screw pieces are connected together via the coupling pieces to form a ribbon screw, thereby easily providing a long ribbon screw conveyer with a large lifting height. Further, the recesses and projections formed at the ends of the screw pieces and at the connected ends of the coupling pieces are engaged with each other and connected together with the coupling members, thereby enabling the screw pieces to be easily and firmly connected together via the coupling pieces. Furthermore, the coupling pieces are each connected between an upper screw piece and a lower screw piece at a same inclination, thus enabling materials to be smoothly conveyed, while precluding the coupling pieces from degrading the conveying capability. Moreover, for maintenance, the screw pieces or the rotation rings can be easily installed and removed by separating the coupling pieces from the screw pieces, so that worn-out parts can be easily replaced with new ones, repaired, or disassembled and adjusted.

The present invention set forth in claim 6 is the screw conveyor apparatus according to claim 1 or 2, characterized in that the ribbon screw is formed by connecting a plurality of screw pieces together in the axial direction via coupling pieces, the coupling pieces are fixed to the rotation rings via coupling means, a recess and a projection are formed in ends of the coupling pieces and in connected ends of the screw pieces, the recess and projection being capable of engaging with each other in a screw surface, the screw pieces and the coupling pieces are continuously connected together along the screw surface at a same inclination, and the coupling means comprises a notched portion formed at a predetermined position of the coupling piece which corresponds to an inner surface of the rotation ring, a mounting piece that can be fitted in and removed from the notched portion, a fixing member that fits the mounting piece in the notched portion to fix it to the coupling piece, and a welded portion in which the mounting piece is joined to the rotation ring.

With the above described configuration, the mounting piece is fitted in the notched portion in the coupling piece to connect the rotation ring to the coupling piece, so that the coupling piece and the rotation ring can be easily disassembled by removing the mounting piece welded to the rotation ring, from the notched portion in the coupling piece. Thus, the coupling pieces, which are prone to be worn out or damaged, can be easily separated from the rotation rings, improving maintainability.

The present invention set forth in claim 7 is the screw conveyor apparatus according to claim 1 or 2, characterized in that an axial width of the rotation ring which protrudes into the casing is in a range of 0.05 to 0.6 times an outer diameter of the screw.

With the above described configuration, the width of the rotation ring which rotates with conveyed materials is set to fall within the range of 0.05 to 0.6 time the outer diameter of the screw. Consequently, the pressure loss of the screw conveyor associated with the rotation rings can be reduced to minimize lowering in conveyance efficiency, and to ensure sufficient mechanical strength which contributes to supporting loads and transmitting power.

The present invention set forth in claim 8 is the screw conveyor apparatus according to claim 1, characterized by further comprising: casing pieces formed by dividing the casing into a plurality of pieces in the axial direction in correspondence to the outer peripheral supporting sections; support rings respectively attached to connected ends of the casing pieces; rotation rings each rotatably supported between the support rings via a seal portion; and a bearing housing each provided between both support rings to cover the rotation ring.

With the above described configuration, the support rings connected to the ends of the casing piece rotatably support the rotation rings, thereby allowing the rotation rings and the support rings to be easily assembled and disassembled, while allowing the rotation rings to be stably supported.

The present invention set forth in claim 9 is the screw conveyor apparatus according to claim 2, characterized by further comprising: casing pieces formed by dividing the casing into a plurality of pieces in the axial direction in correspondence to the outer peripheral supporting sections; support rings attached to the respective connected ends of the casing pieces; rotation rings each rotatably supported between the support rings via a seal portion; a bearing housing provided between both support rings to cover the rotation ring; and an auxiliary screw rotating device provided in the bearing housing, the device comprising a drive pinion that meshes with a passive gear provided on the rotation ring and a rotational drive device that rotationally drives the drive pinion.

With the above described configuration, the support rings connected to the ends of the casing piece rotatably support the rotation rings, thereby allowing the rotation rings and the support rings to be easily assembled and disassembled, while allowing the rotation rings to be stably supported. Further, the outer peripheral supporting sections can be used to easily arrange the auxiliary screw rotating device in an intermediate portion of the casing.

The present invention set forth in claim 10 is the screw conveyor apparatus according to claim 1 or 2, characterized in that a loading screw conveyor is connected to a lower end of the casing, and loading means is provided at a tip portion of the loading screw conveyor to collect and supply conveyed materials to the loading conveyor.

With the above described configuration, the loading means supplies conveyed materials to the loading screw conveyor, which further forcibly supplies them to the interior of the cylindrical casing, thus enabling the conveyed materials to be conveyed along a steep slope up to an upper position even when the materials are grains. Further, the loading means allows conveyed materials to be easily and smoothly unloaded from, for example, a hold in a cargo vessel which has corners.

The present invention set forth in claim 11 is the screw conveyor apparatus according to claim 1 or 2, characterized in that a loading screw conveyor is connected to a lower end of the casing, loading means is provided at a tip portion of the loading screw conveyor to collect and supply conveyed materials to the loading conveyor, and the loading means is composed of a reclaimer device having a bucket wheel driven to rotate around a predetermined axis.

With the above described configuration, the reclaimer device can feed a large amount of conveyed materials into the casing via the loading screw conveyor to fill the casing with the conveyed materials, thereby efficiently achieving a lifting operation.

BEST MODE FOE CARRYING OUT THE INVENTION

To describe the present invention in detail, the accompanying drawings will be referenced.

(First Embodiment)

A first embodiment will be described with reference to FIGS. 1 to 5.

Figure 1:
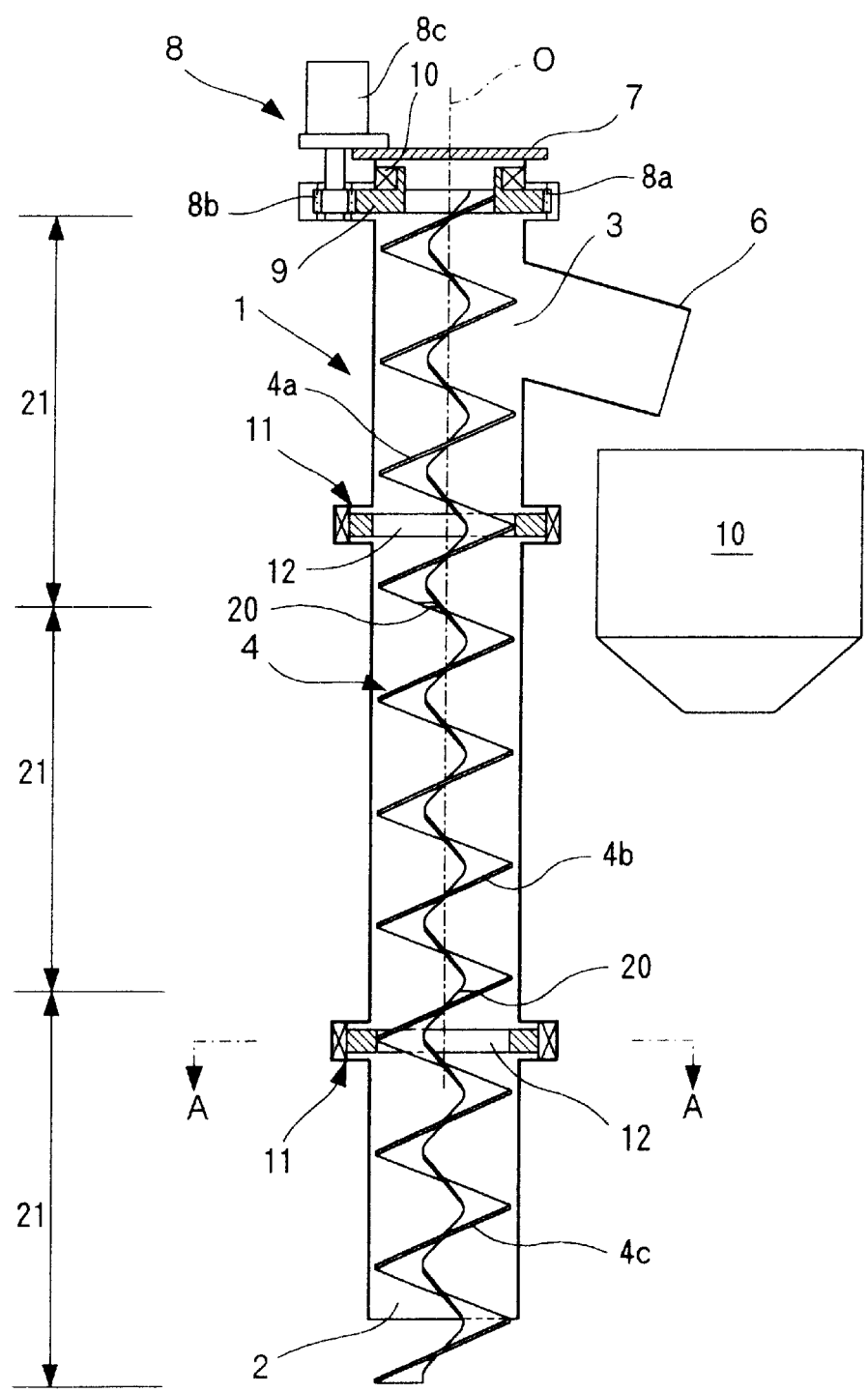
FIG. 1 is a general side sectional view showing a first embodiment of a screw conveyor apparatus according to the present invention.

This screw conveyor conveys sediments (conveyed materials) via a shaft, the sediments having been drilled using, for example, a tunnel excavator on the earth side. As shown in FIG. 1, a cylindrical casing 1 having an inlet 2 at its lower end and a discharge port 3 at its upper end has a ribbon screw 4 provided on the same axis O. The cylindrical casing 1 has a discharge chute 6 mounted at its upper end and connected to the discharge port 3, and a screw rotating device 8 also provided at its upper end to drive the ribbon screw 4 to rotate around the axis O. Reference numeral 10 denotes a loading hopper in which sediments from the discharge chute 6 are loaded.

Instead of the discharge port 3, an upper end member 7 may be omitted or a discharge port may be formed in the upper end member 7 so that sediments are discharged from the upper end of the cylindrical casing 1.

The ribbon screw 4 has a drive ring 9 secured to its upper end and supported at the upper end of the cylindrical casing 1 via an outer bearing 10 so as to be rotatable around the axis O. The screw rotating device 8 is composed of a passive ring gear 8a attached to an outer peripheral portion of the drive ring 9, a drive pinion 8b that meshes with the passive ring gear 8b, and a screw rotation driving device (hydraulic or electric motor) 8c that rotationally drives the drive pinion 8b.

Figure 2:
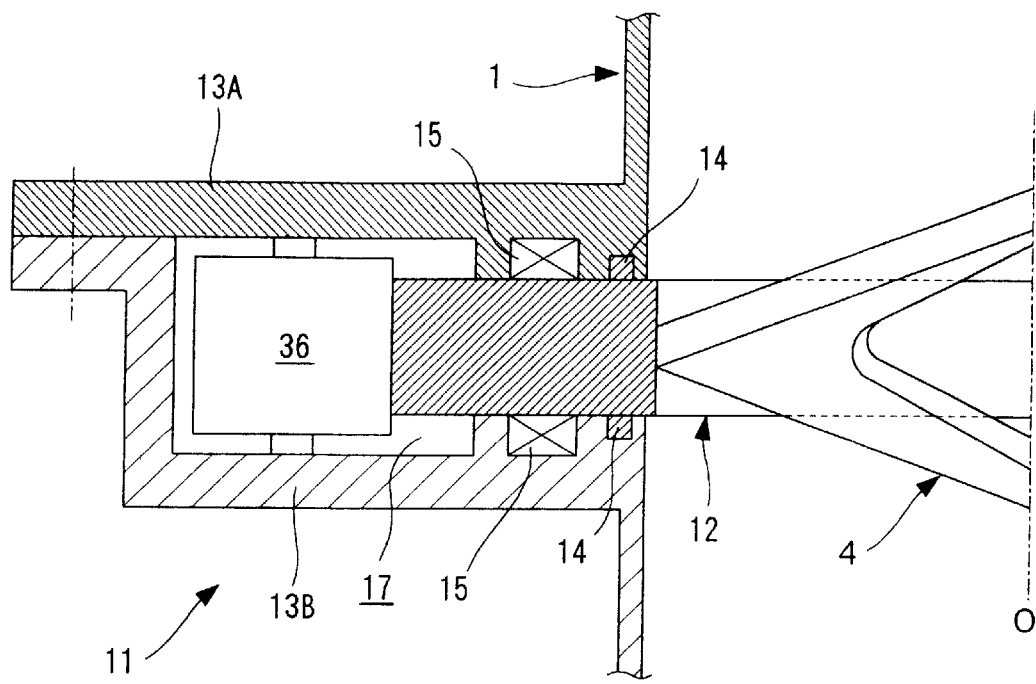
FIG. 2 is an enlarged side sectional view showing an outer peripheral supporting section of the apparatus.
Figure 3:
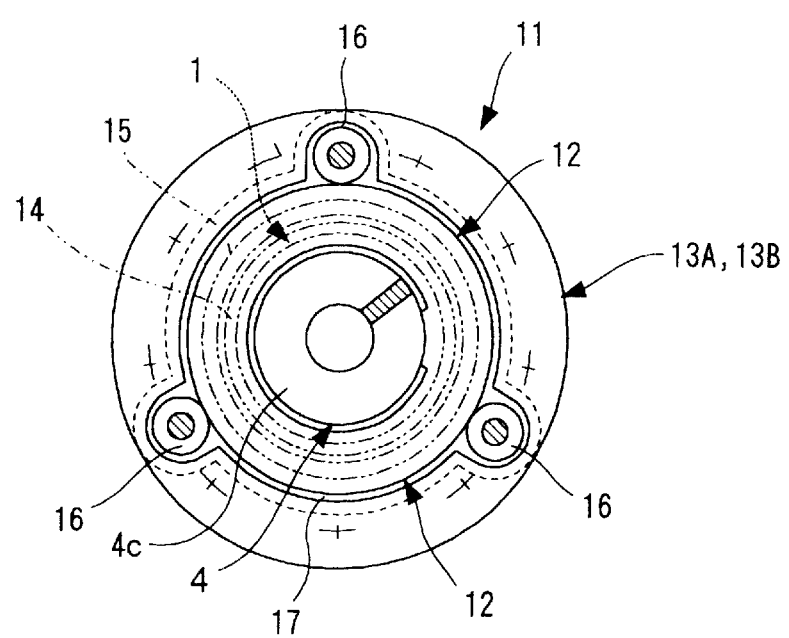
FIG. 3 is a sectional view taken along a line A—A, shown in FIG. 1.

Further, the cylindrical casing 1 has a plurality of (in FIG. 1, two) outer peripheral supporting sections 11, which support the ribbon screw 4 rotationally provided at predetermined intervals in the axial direction. As shown in FIGS. 2 and 3 the outer peripheral supporting sections 11 each have a rotation ring 12 externally fittingly fixed to the ribbon screw 4 at an arbitrary position thereof and supported on the cylindrical casing 1 so as to be rotatable around the axis O. That is, as shown in FIG. 2, the outer peripheral supporting section 11 of the cylindrical casing 1 has flange portions 13A and 13B attached thereto to form an annular space 17. In the annular space 17, an inner peripheral seal member 14 and an outer peripheral bearing 15 are disposed between the vertically opposite surfaces of the flange portions 13A and 13B; the inner peripheral seal member 14 is in sliding contact with the rotation ring 12, and the outer peripheral bearing 15 supports loads imposed in a thrust direction. Further, the flange portions 13A and 13B have a plurality of guide rollers 16 arranged in an outer peripheral portion thereof at predetermined angles (in the drawings, at three positions at 0°, 120°, and 240°) so as to be rotatable around an axis parallel with the axis O. The flange portions 13A and 13B guide the rotation of the rotation ring 12 every circumferential predetermined angle (in the drawings, 120°) and support loads imposed in a radial direction. Accordingly, the loads imposed on ribbon screw 4 in the thrust and radial directions can be borne to effectively prevent the ribbon screw 4 from being bent, twisted, or expanded or contracted.

Figure 4:
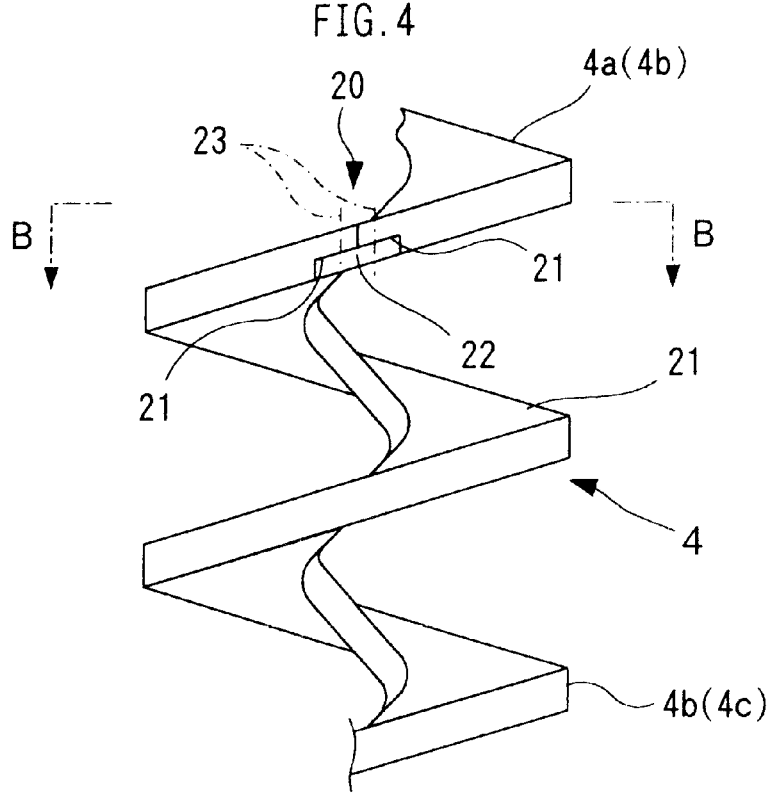
FIG. 4 is a side view showing a connected portion of a screw piece of the apparatus.
Figure 5:
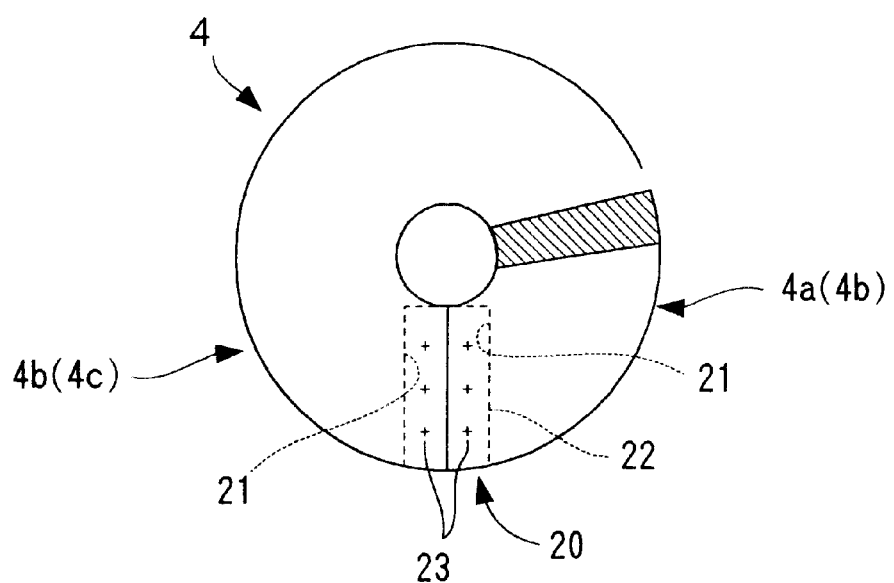
FIG. 5 is a sectional view taken along a line B—B, shown in FIG. 4.

Furthermore, the ribbon screw 4 of the screw conveyor is formed by connecting a plurality of (in the drawings, three) screw pieces 4a to 4c together. According to a first specific example of such a connected portion 20, as shown in FIGS. 4 and 5, a coupling recess 21 is formed at a connected end of each of the screw pieces 4a to 4c on a rear side of a sediment extruding surface thereof, and the ribbon screw 4 is formed by fitting a joint plate 22 in the coupling recesses 21 of the screw pieces and coupling the joint plates 22 and the screw pieces 4a to 4c together using bolts 23. The connected portion 20 is formed to have the same thickness as the screw pieces 4a to 4c so that rotational force is effectively transmitted from the higher screw piece 4a to the lower screw piece 4c via the connected portion 20.

Figure 6:
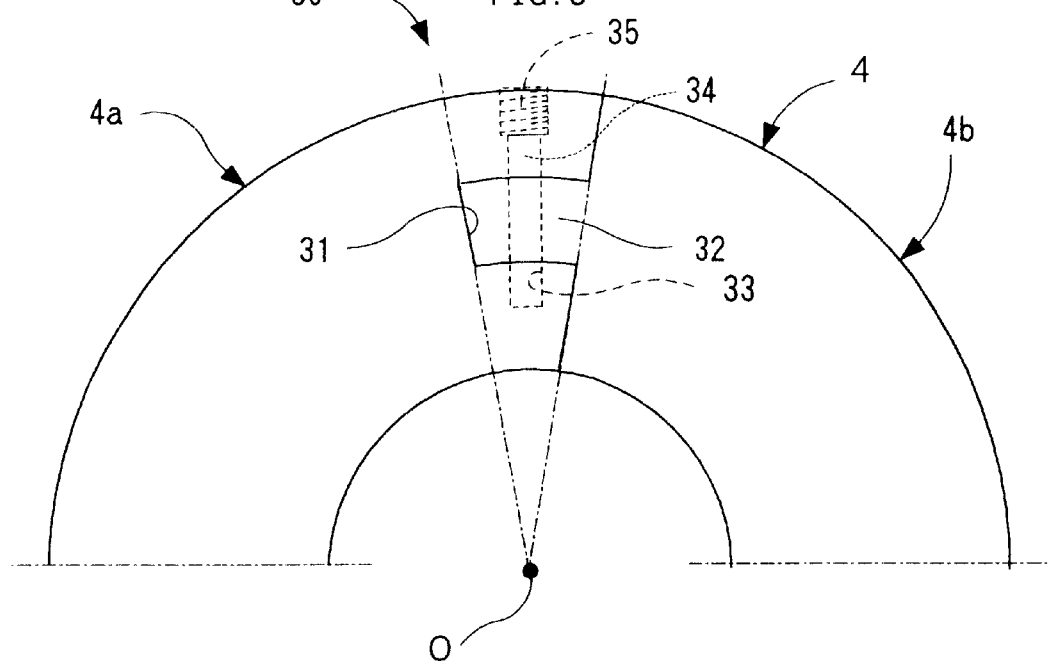
FIG. 6 is a plan view showing a second specific example of the connected portion.
Figure 7:
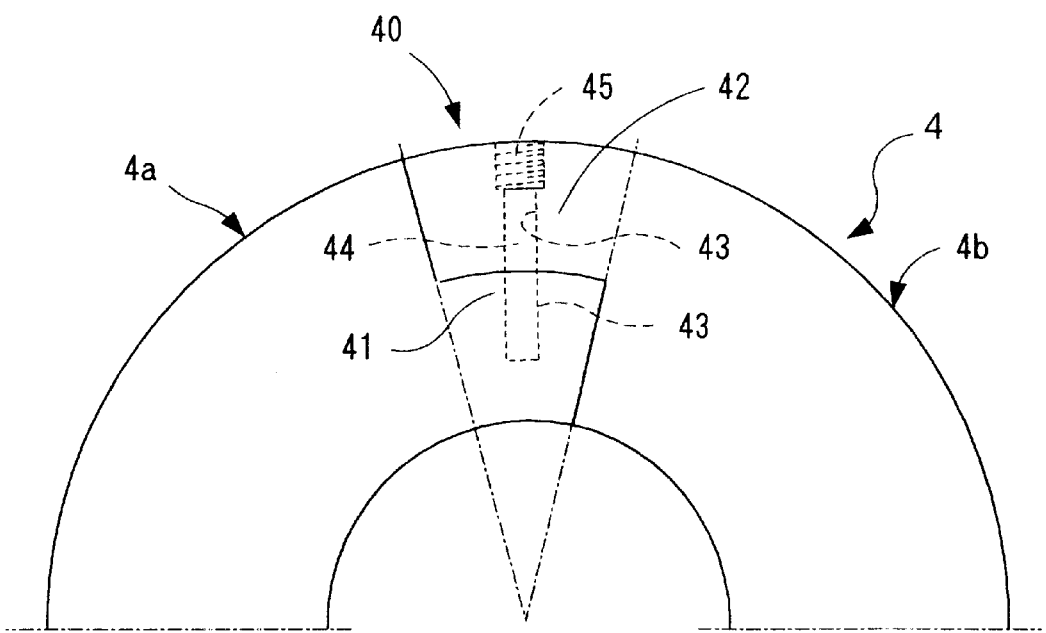
FIG. 7 is a plan view showing a third specific example of the connected portion.

FIGS. 6 and 7 show a second and third specific examples, respectively. That is, in a connected portion 30 in the second specific example in FIG. 6, a coupling recess 31 (recess and projection) that appears to be recessed as viewed in plan is formed at the connected end of one 4a (4b) of the screw pieces in a fan-shaped surface of a predetermined angle around the screw axis O, while an coupling projection (recess and projection) 32 that appears to project as viewed in plan and that is fitted over the coupling recess 31 is formed at the connected end of the other screw piece 4b (4c). A pin hole 33 is formed in a portion in which the coupling recess 31 is fitted over the coupling projection 32, so as to extend in the radial direction. A coupling pin 34 is fitted in the pin hole 33 to couple and fix them together, and a screw type blank cap 35 is embedded in the opening of the pin hole 33 to prevent the coupling pin 34 from slipping out therefrom.

In a connected portion 40 in a third specific example in FIG. 7, a coupling staged portion (recess and projection) 41 that appears to be L-shaped as viewed in plan in a screw surface is formed at the connected end of one 4a (4b) of the screw pieces, whereas a coupling inverse-staged portion 42 (recess and projection) that engages with the coupling staged portion 41 is formed at the connected end of the other screw piece 4b (4c). A pin hole 43 is formed in a portion in which the coupling staged portions 41 and 42 are fitted together, so as to extend in the radial direction. A coupling pin 44 is fitted in the pin hole 43 to couple and fix them together, and a screw type blank cap 45 is embedded in the opening of the pin hole 43 to prevent the coupling pin 44 from slipping out therefrom.

According to the second and third specific examples, the shapes of the connected ends of the screw pieces 4a to 4c, which mesh with each other, enable the screw pieces 4a to 4c to be firmly connected together via the radial coupling pins 34 and 44. Further, this construction includes no protrusions, so that the conveyance of sediments is not hindered. In the second and third specific examples, the pin holes 33 and 43 are formed to extend from the outer periphery of the ribbon screw toward the axis O, but of course it may be formed to extend from the inner periphery.

Figure 8:
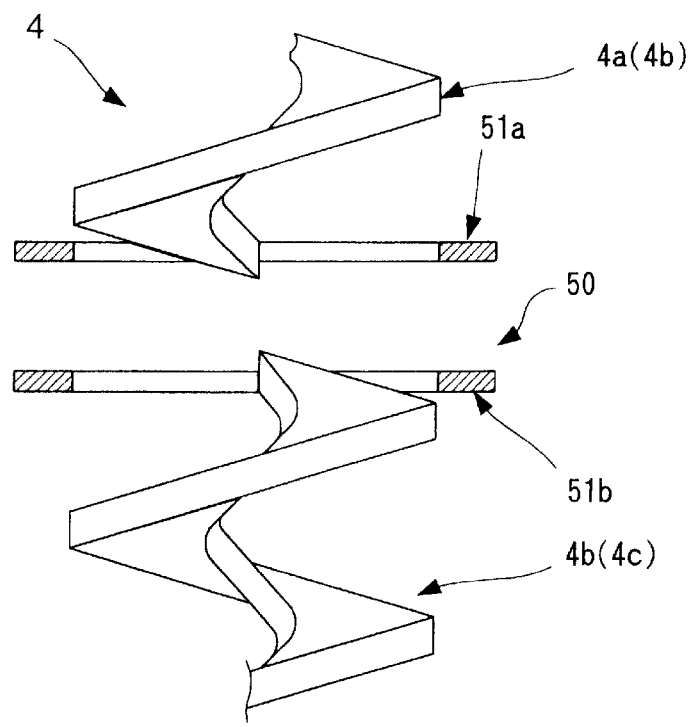
FIG. 8 is an exploded side view showing a fourth specific example of the connected portion.
Figure 9:
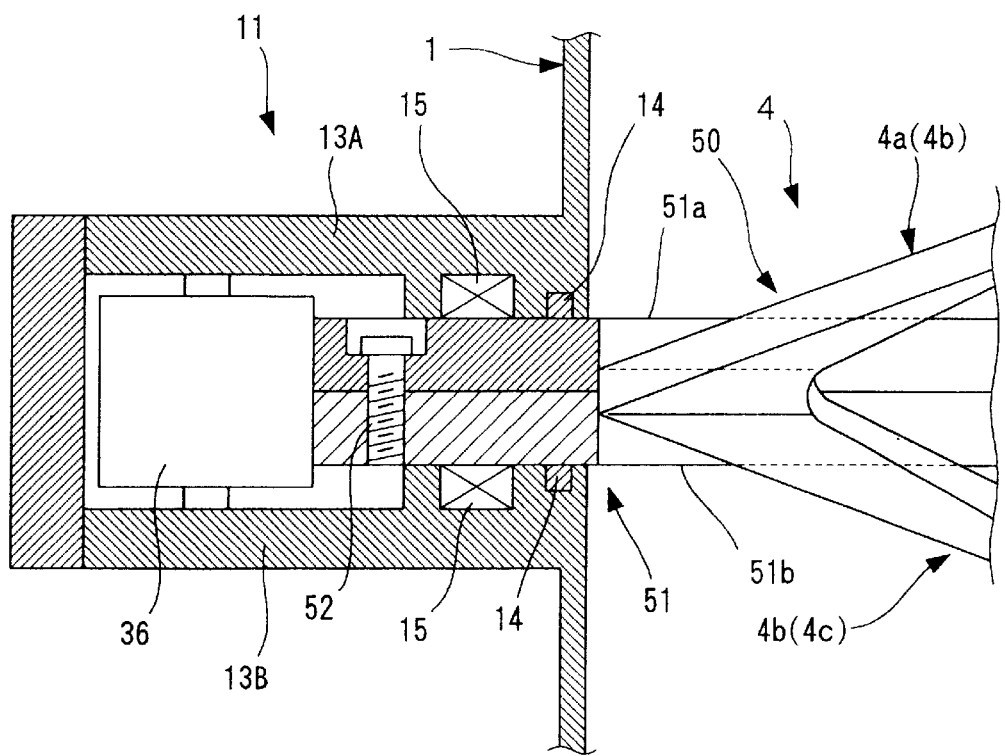
FIG. 9 is an enlarged side sectional view of an assembled portion of the fourth specific example of the connected portion.

Next, a connected portion 50, a fourth specific example, is optimum for screw conveyors with a large lifting height as shown in FIGS. 8 and 9. That is, the screw pieces 4a to 4c have their connected ends cut along a traverse surface orthogonal to the axis O, and connection rings 51a and 51b are externally fittingly secured to the respective cut end surfaces by welding. The connection rings 51a and 51b constitute the rotation ring of the outer peripheral supporting section 11.

That is, the connection rings 51a and 51b are sized to externally fit over the screw pieces 4a to 4c, and are placed on each other and then coupled and fixed together using a plurality of fixing bolts 52 as fixing members. Then, a combined connection ring 51 composed of the connection rings 51a and 51b is rotatably supported via the seal member 14, the outer peripheral bearing 15, and the guide rollers 16.

Consequently, a long ribbon screw 4 can be easily produced by connecting the plurality of screw pieces 4a to 4c together using the connected portion 50, in which the combined connection ring 51 allows the ends of the screw pieces 4a to 4c be connected together. Furthermore, the connection rings 52 reinforce the connected portions 50 between the screw pieces 4a to 4c, the strength of which is likely to decrease. Moreover, the screw pieces are supported by the outer peripheral supporting sections 11 of the cylindrical casing 1 via the combined connection ring 51, thereby effectively preventing the ribbon screw 4 from being bent, twisted, or expanded or contracted.

(Second Embodiment)

Figure 10:
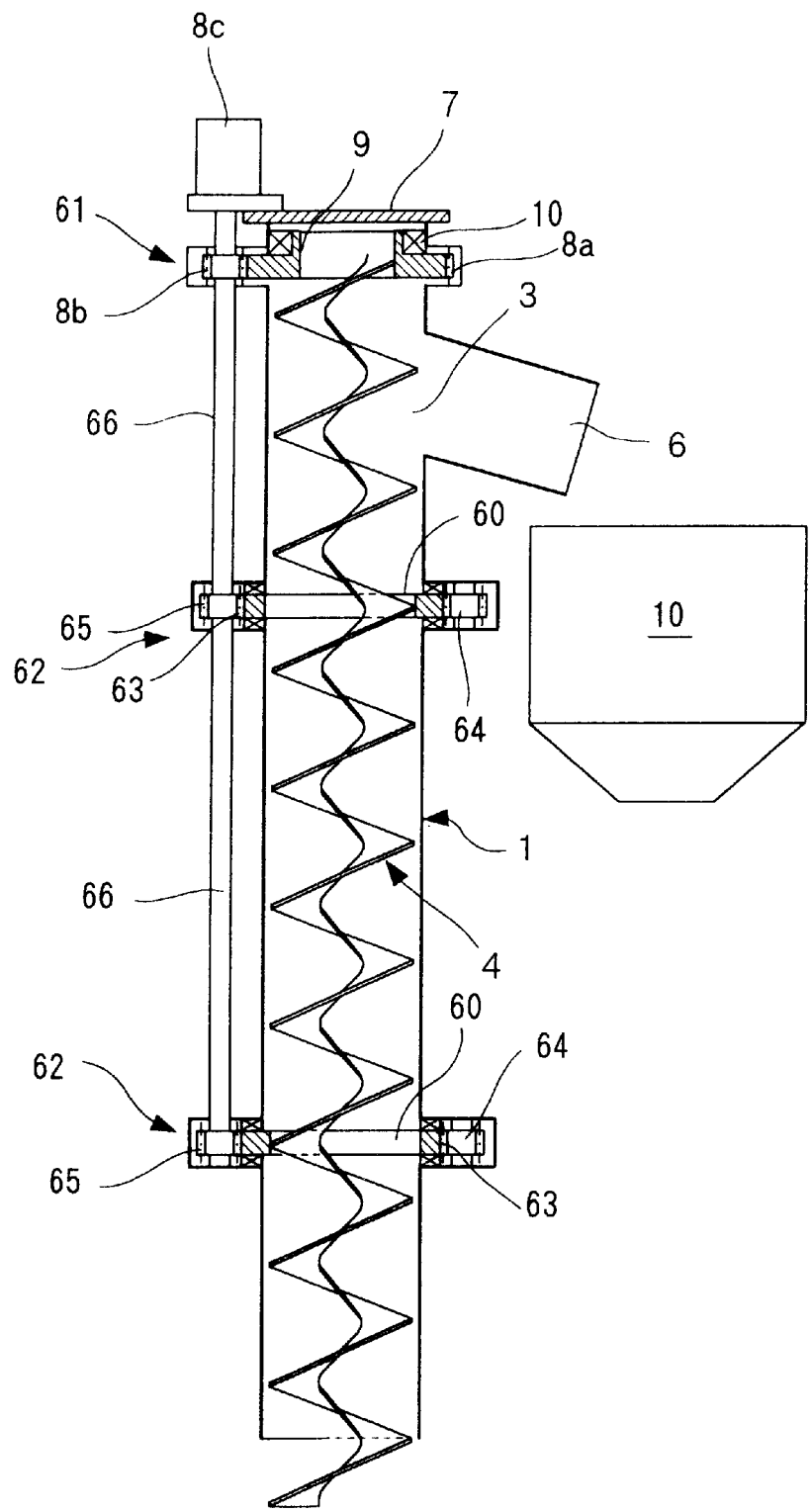
FIG. 10 is a general side sectional view showing a second embodiment of the screw conveyor apparatus according to the present invention.

A second embodiment will be described with reference to FIG. 10. The second embodiment is constructed so that at least one of the outer peripheral supporting sections 11 of the first embodiment transmits rotational drive force to the ribbon screw 4.

That is, this embodiment comprises a main screw rotating device 61 having the same construction as the screw rotating device 8 of the first embodiment, and auxiliary screw rotating devices 62 are provided on arbitrary ones of (in the drawing, all) the outer peripheral supporting sections 11.

In a first specific example of the auxiliary screw rotating device 62, a ring gear 63 is provided on a driving rotation ring (rotation ring) 60 constituting the rotation ring of the outer peripheral supporting section 11. Further, guide pinions 64 are arranged at a plurality of locations instead of the guide rollers, and one of the guide pinions is used as a drive pinion 65, or the drive pinion 65 is provided at only one location. A screw rotation driving device 8c of the main screw rotating device 61 is used as a drive source, and a drive pinion 8b of the main screw rotating device 61 and drive pinions 65, 65 of the auxiliary screw rotating device 62 are coupled and interlocked together via an interlocking shaft 66. Thus, the main screw rotating device 62 can cause the outer peripheral supporting sections 11 to rotationally drive the ribbon screw 4.

Figure 11:
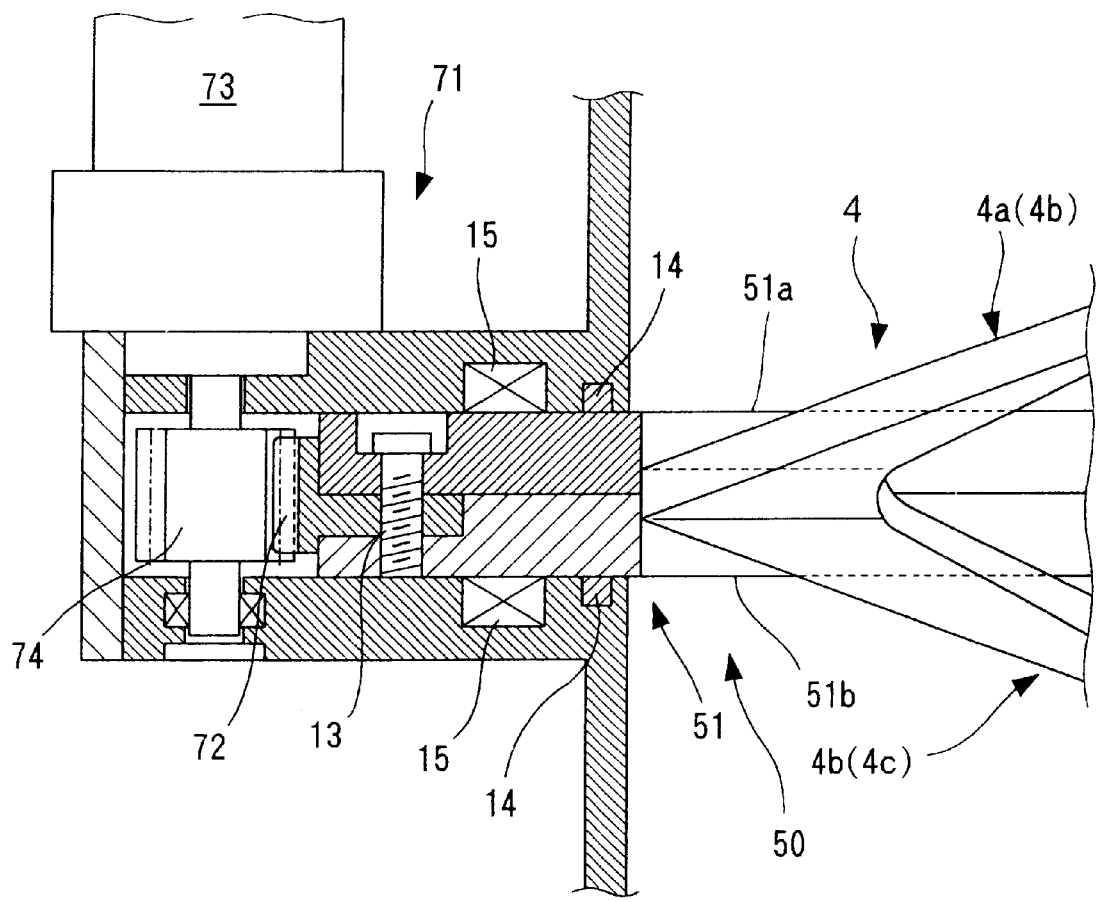
FIG. 11 is an enlarged side sectional view showing a second specific example of an auxiliary screw rotating device of the apparatus.

FIG. 11 shows a second specific example of the auxiliary screw rotating device based on FIG. 9, in which the same members are denoted by the same reference numerals. In an auxiliary screw rotating device 71, a ring gear 72 is attached to the combined connection ring (driving rotation ring) 51, formed by placing the connection rings 51a and 51b vertically on each other, and is meshed with a drive pinion 74 rotationally driven by an auxiliary rotation driving device 73.

Accordingly, the combined connection ring can bear loads imposed on the ribbon screw 4 in its intermediate portion, and the auxiliary screw rotating device 71 can apply rotational drive force to the ribbon screw 4 in its intermediate portion. This precludes the ribbon screw 4 from being bent or expanded, thereby enabling materials to be conveyed up to a high position.

Figure 12:
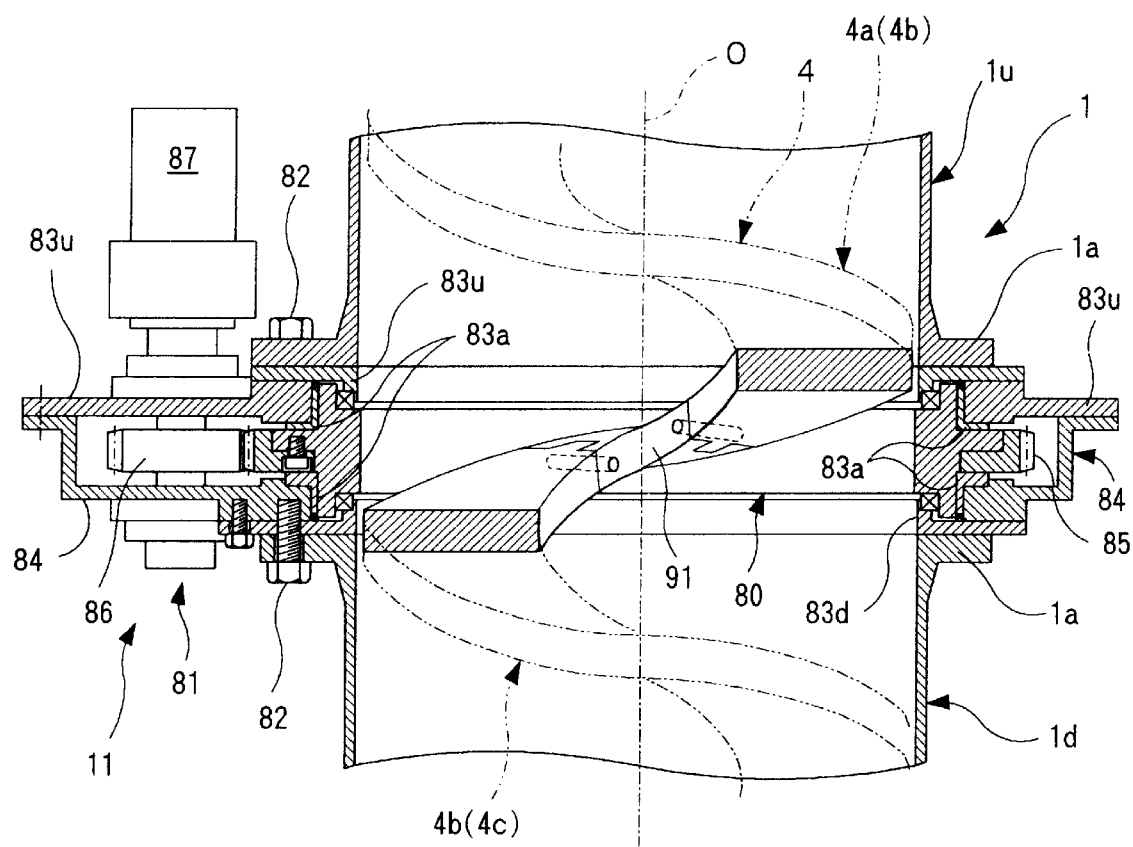
FIG. 12 is an enlarged side sectional view showing a third specific example of the auxiliary screw rotating device of the apparatus.

FIG. 12 shows a third specific example of an auxiliary screw rotating device 81.

The cylindrical casing 1 is divided into a plurality of casing pieces 1u and 1d in the direction of the axis O, and the upper cylindrical casing piece 1u and the lower cylindrical casing piece 1d have support rings (also referred to as "wear rings") 83u and 83d, respectively, fixed to their connected ends that is, a flange portion 1a via a coupling volt 82. A driving rotation ring (rotation ring) 80 is supported between the support rings 83u and 83d via a seal member and a bearing member 83a so as to be rotatable around the axis O. Further, a bearing cover 84 that covers the driving rotation ring 80 is attached between the support rings 83u and 83d, and has a passive ring gear 85 integrally attached to the driving rotation ring 80, a drive pinion 86 that meshes with the passive ring gear 85, and an auxiliary rotation driving device 87 that rotationally drives the drive pinion 86, thereby constituting the auxiliary screw rotating device 81. The auxiliary screw rotating device 81 can also be used as a main screw rotating device.

Consequently, the auxiliary rotation driving device 87 rotationally drives the driving rotation ring 80 via the drive pinion 86 and the passive ring gear 85.

Further, the ribbon screw 4 is divided into a plurality of pieces in the direction of the axis O, which are connected together with the outer peripheral supporting sections 11. That is, a coupling piece 91 is provided correspondingly to the driving rotation ring 80 to integrally connect the higher screw piece 4a (4b) and the lower screw piece 4b (4c) together. Further, as shown in FIG. 13, the coupling piece 91 is joined to the inner surface of the driving rotation ring 80 via a welded portion 92.

Figure 13:
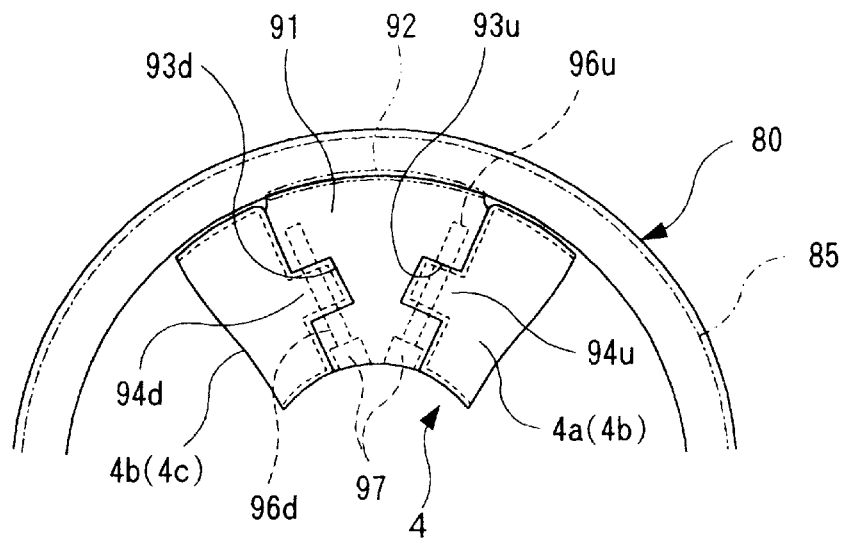
FIG. 13 is a partial plan sectional view of a specific example of a connected portion of a coupling piece of the apparatus.

FIG. 13 shows a specific example of a connected portion of the coupling piece. The coupling piece 91 has coupling recesses (recess and projection) 93u and 93d formed at an upper and lower connected portions thereof and appearing to be recessed as viewed in plan in the screw surface. On the it other hand, the screw pieces 4a and 4d have coupling projections (recess and projection) 94u and 94d, respectively, formed at their connected ends and appearing to project as viewed in plan in the screw surface; the coupling projections 94u and 94d can be fitted in the fitting recesses 93u and 93d, respectively. The coupling recesses 93u and 93d and the coupling projections 94u and 94d have pin holes 96u and 96d, respectively, formed therein so as to extend in the radial direction and in which coupling pins 95u and 95d, respectively, are installed and are prevented from slipping out, using a screw type blank cap 97.

In the above configuration, the screw pieces 4a and 4b are connected together with the coupling piece 91 via the coupling pins 95u and 95d, and the coupling piece 91 is secured to the drive ring 80 via the welded portion 92. Accordingly, worn-out parts such as the driving rotation ring 80, the support rings 83u and 83d, and the screw pieces 4a to 4c can be easily inspected, replaced with new ones, or repaired. Further, the driving rotation ring 80 provided with the coupling piece 91 is integrated with the auxiliary screw rotating device 81, thus facilitating replacement, assembly, transportation, and storage.

Figure 14:
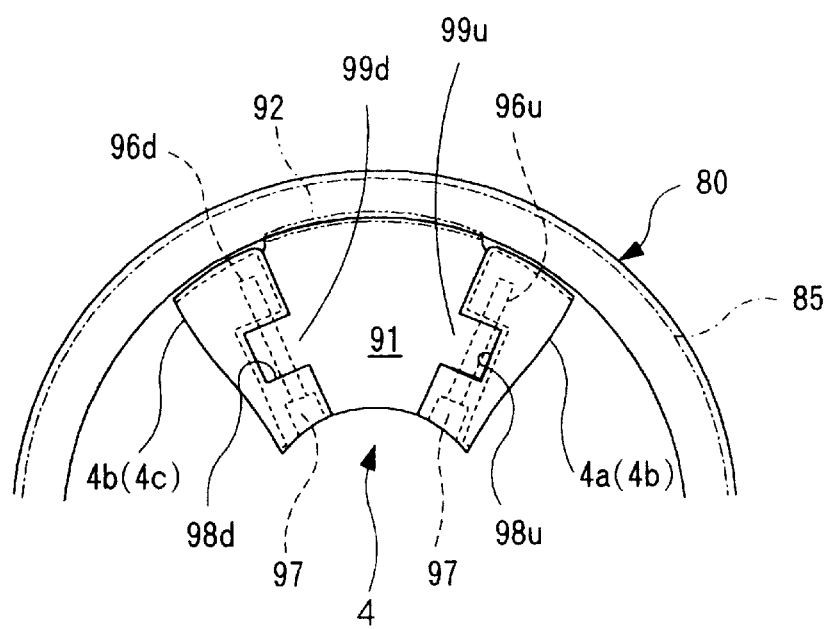
FIG. 14 is a partial plan sectional view of another specific example of the connected portion of the coupling piece of the apparatus.

FIG. 14 is another specific example of the connected portion of the coupling piece, which is a variation of the example in FIG. 13. That is, the screw pieces 4a and 4b have fitting recesses 98u and 98d, respectively, formed therein, and the coupling piece 91 has coupling projections 99u and 99d formed thereon. The above described configuration produces effects similar to those of the preceding example.

Figure 15:
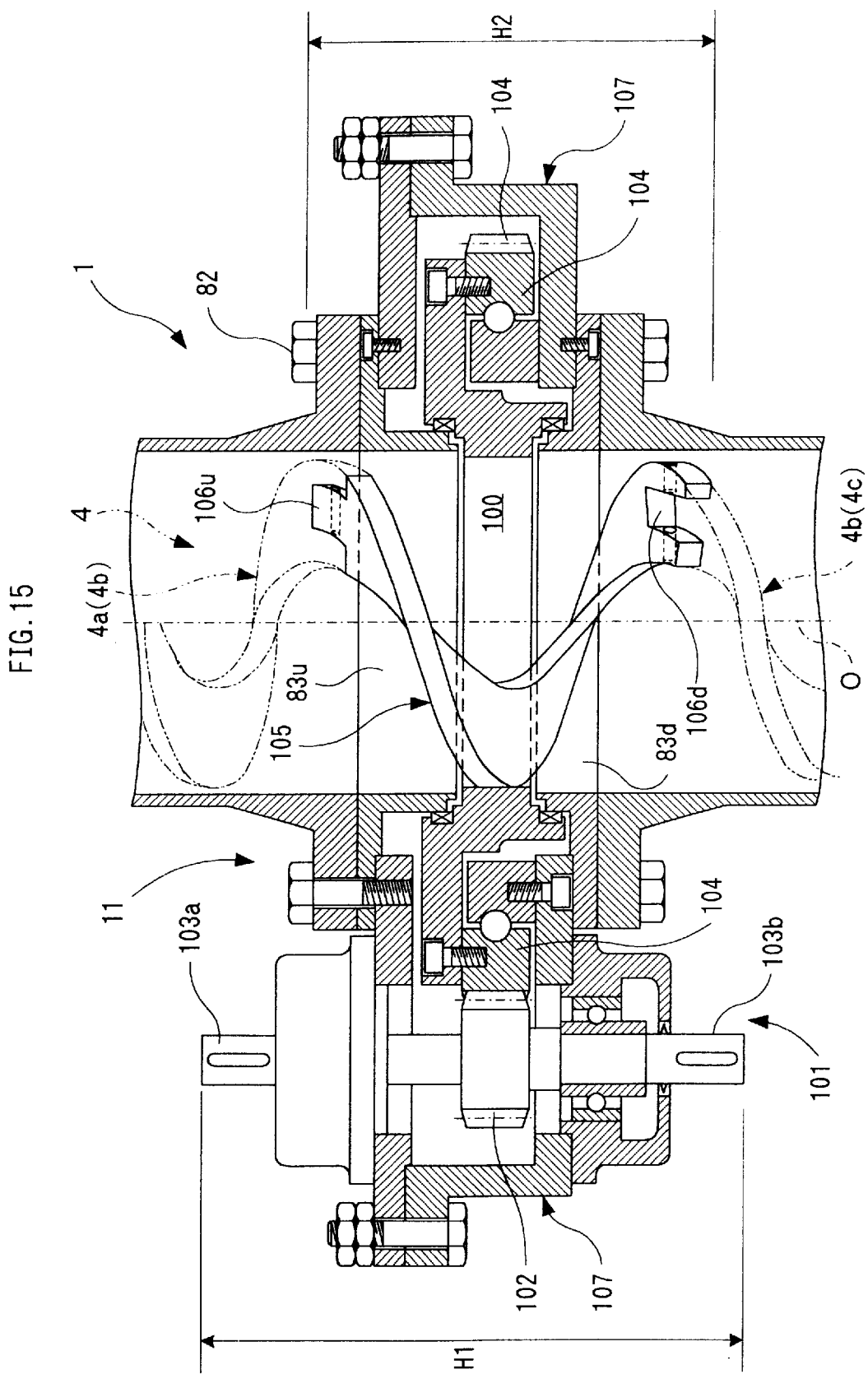
FIG. 15 is an enlarged side sectional view showing a fourth specific example of the auxiliary screw rotating device of the apparatus.

FIG. 15 shows a fourth specific example of the auxiliary screw rotating device (however, this is also applicable to the main screw rotating device). An auxiliary screw rotating device 101 has a unit structure in which rotating shafts 103a and 103b of a drive pinion 102 are integrally assembled with a bearing 104 of a rotational drive ring 100. The auxiliary screw rotating device 101 is formed to have a height H1 for transportation and handling.

That is, the coupling piece 105 is constructed to have a height H2 substantially equal to one pitch of the ribbon screw 4 and to be freely coupled to and separated from the screw pieces 4a to 4c. When the height H2 is smaller than the unit height H1, the coupling piece 105 does not obstruct transportation or storage. Further, the coupling piece 105 has a coupling projection 106u and a fitting recess 106d formed at its upper and lower connected ends, respectively, and which are fitted in the upper screw piece 4a (4b) and over the lower screw piece 4b (4c), respectively, for connection. Furthermore, the driving rotation ring 100 has the bearing 104 integrally attached thereto and fixed to the bottom of a bearing housing 107 with a bolt. Further, the coupling piece 105 is secured directly to the driving rotation ring 100 by welding.

The coupling piece 105 and the driving rotation ring 100 can be connected together in a plurality of other forms as shown below.

Figure 16A:
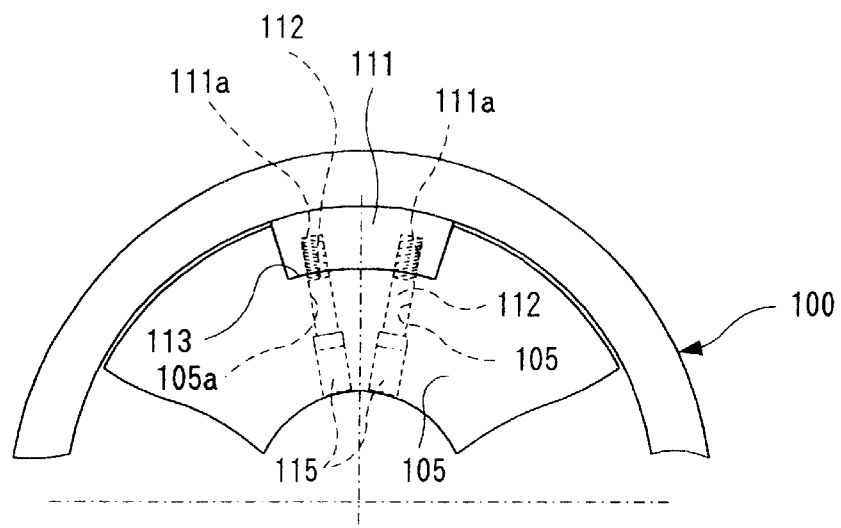
FIGS. 16a and 16b are a partial plan view and a side view showing a first form of a connected portion between the coupling piece and a driving rotation ring of the apparatus.
Figure 16B:
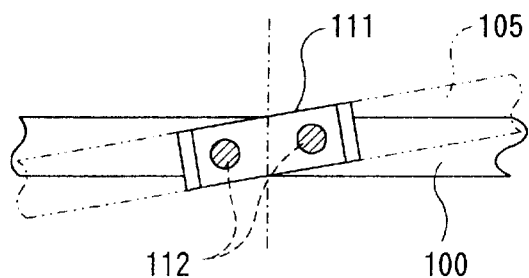
Figure 17:
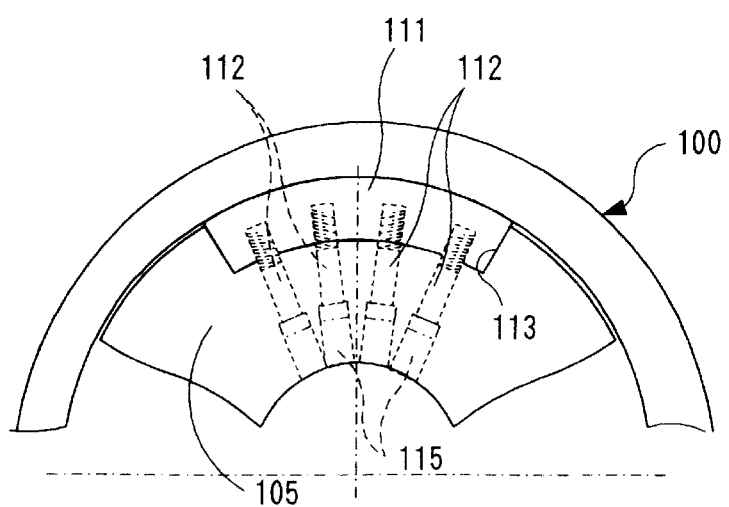
FIG. 17 is a partial plan view showing a variation of the first form of the connected portion between the coupling piece and the driving rotation ring of the apparatus.

A first form uses a mounting piece 111 and a fixing bolt 112 as shown in FIGS. 16(a) and 16(b). That is, the coupling piece 105 has a notched portion 113 formed in an outer peripheral portion thereof and in which the mounting piece 111, welded to the inner surface of the driving rotation ring 100, is fitted. Two fixing bolts 112 as fixtures are installed in bolt holes 111a in the mounting piece 111 through mounting holes 105a formed in the coupling piece 105. The coupling piece 105 is coupled and fixed to the driving rotation ring 100 via the mounting piece 111. As shown in FIG. 17, the coupling piece 105 and the mounting piece 111 can be fixed together using three or more fixing bolts 112. Reference numeral 115 denotes a blank cap.

Figure 18:
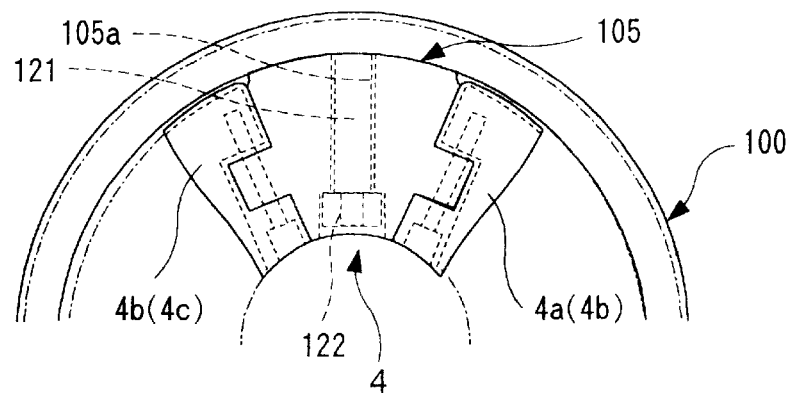
FIG. 18 is a partial plan view showing a second form of the connected portion between the coupling piece and the driving rotation ring of the apparatus.

In a second form, the driving rotation ring 100 and the coupling piece 105 are fixed together using, for example, a single coupling pin 121, as shown in FIG. 18. The driving rotation ring 100 has the single coupling pin 121 embedded in the inner surface thereof so as to extend in the radial direction. The coupling piece 100 has a pin hole 100a formed therein and in which the coupling pin 121 can be fitted. Further, a fixing nut 122 is installed on a head of the coupling pin 121 to couple and fix the driving rotation ring 100 and the coupling piece 105 together.

Figure 19A:
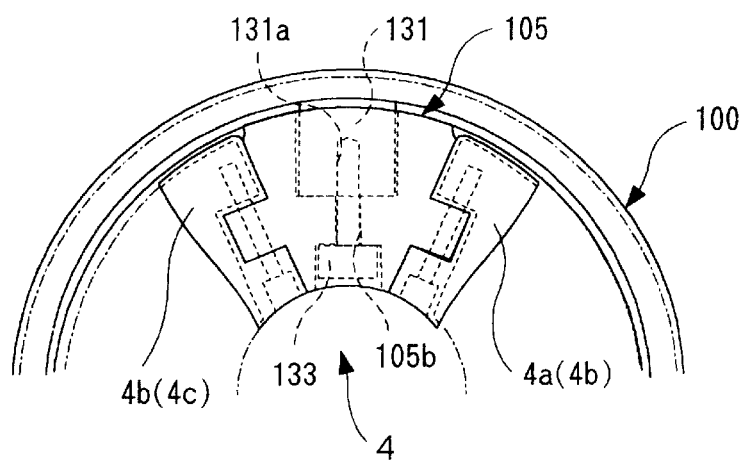
FIGS. 19a and 19b are a partial plan view and a side view showing a third form of the connected portion between the coupling piece and the driving rotation ring of the apparatus.
Figure 19B:
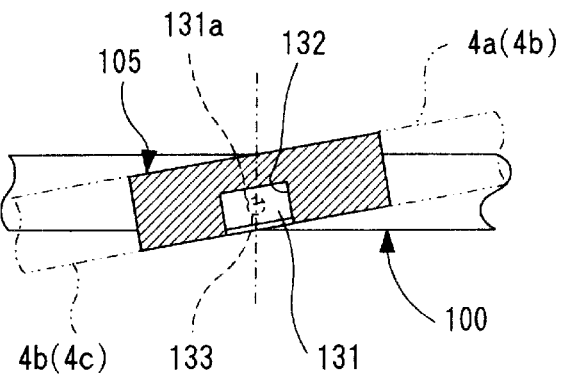

In a third form, the driving rotation ring 100 has a coupling block (mounting piece) 131 projectingly provided on the inner surface thereof, and the coupling piece 105 has a groove 132 formed therein and in which the coupling block 131 is fitted, as shown in FIGS. 19(a) and 19(b). A fixing bolt 133 is installed in bolt holes 105b and 131a in the coupling piece 105 and coupling block 131, respectively.

Figure 20:
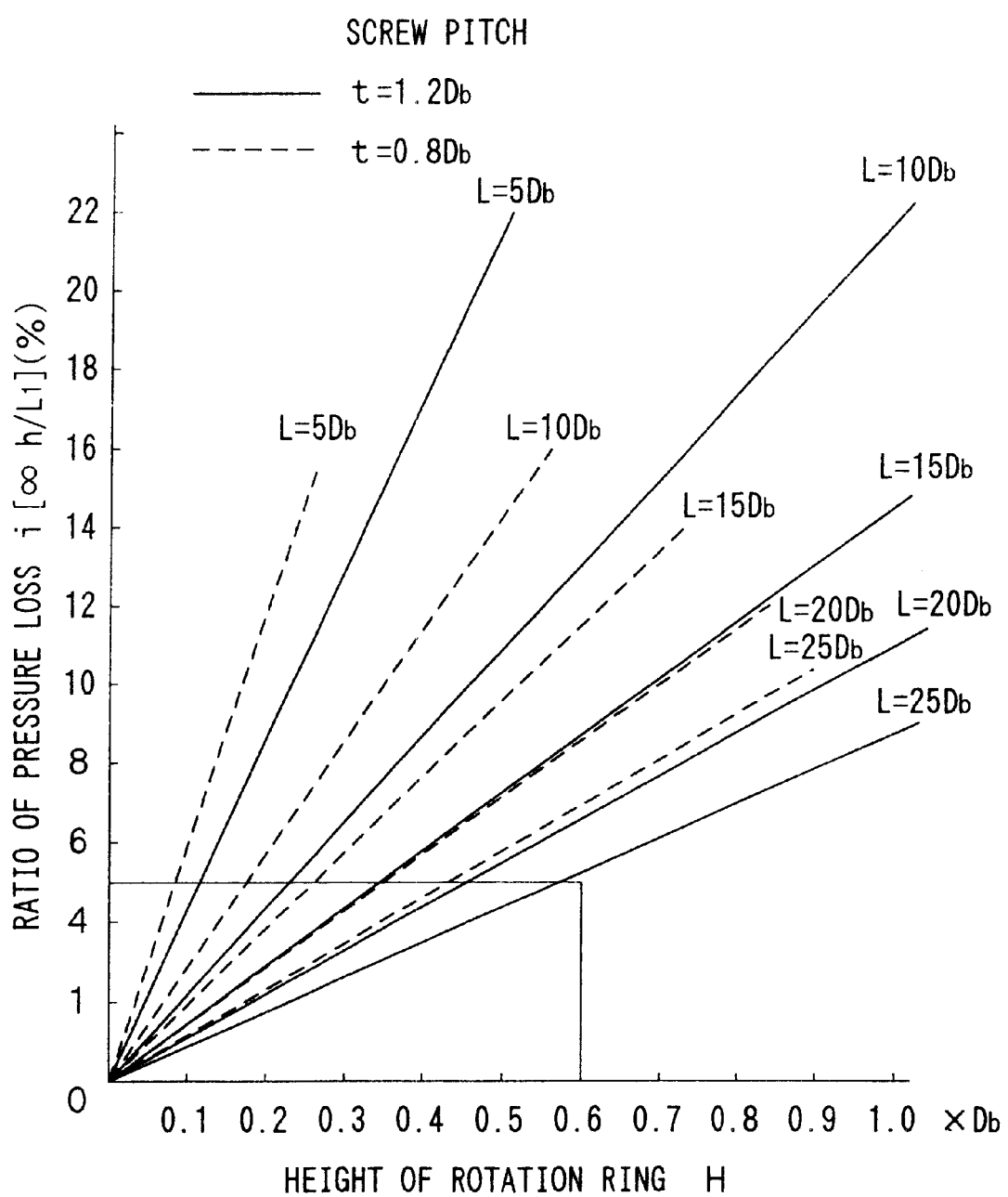
FIG. 20 is a graph showing the height of the rotation ring vs. pressure losses in the screw conveyor apparatus.

In this regard, the mounting strength of the ribbon screw 4 increases consistently with the axis O-wise width (height) of the driving rotation ring 50, 80, or 100, including the combined connection ring 51, but as shown in FIG. 20, conveyed sediments may rotate with the rotation ring to make conveyance force ineffective within the rotation ring.

Thus, the height of the rotation ring is desirably reduced to increase conveyance efficiency. The inventor has documented the pressure loss associated with the rotation of sediments with the rotation ring, in the section titled "Earth Pressure Retention Characteristic of a Screw Conveyor for an Earth Pressure Shield" of Japan Construction Mechanization Association "Symposium on Construction Machinery and Construction in 1999".

FIG. 20 shows the relationship between the ratio of the pressure loss of the rotation ring to the length of the conveyor and the height h of the rotation ring, in the case where the screw dimensions are set so that the outer diameter: Db=1, the pitch: t=1.2 Db, the blade thickness: e=0.07 Db, and the blade height: H=0.3 Db, for example. However, in this graph, one rotation ring is provided for the length L of the conveyor. Additionally, in the above published document, the discharge angle: θ=10°.

Typically, the length L of the conveyor is about 10 to 25 times as large as the outer diameter Db of the screw, so that if the pressure loss i per rotation ring is to be set at about 5%, it is necessary that the height h of the rotation ring $\geq 0.6$ Db. If the height of the rotation ring is 0.6 Db or more, the pressure loss increases to reduce conveyance efficiency. On the other hand, if the height h of the rotation ring is less than 0.05 Db, then the mounting strength of the screw will be insufficient. Of course, with two rotation rings, the pressure loss is doubled to i=10%. In the above embodiment, the heights of the rotation rings, including the driving one, can be shown as numerical values, thereby allowing conveyance efficiency and the loss of transportation power to be predicted in a design stage. Indicated by broken lines in FIG. 20 are the cases where the pitch of the screw, t, is 0.8 Db, that is t=0.8 Db.

Figure 21B:
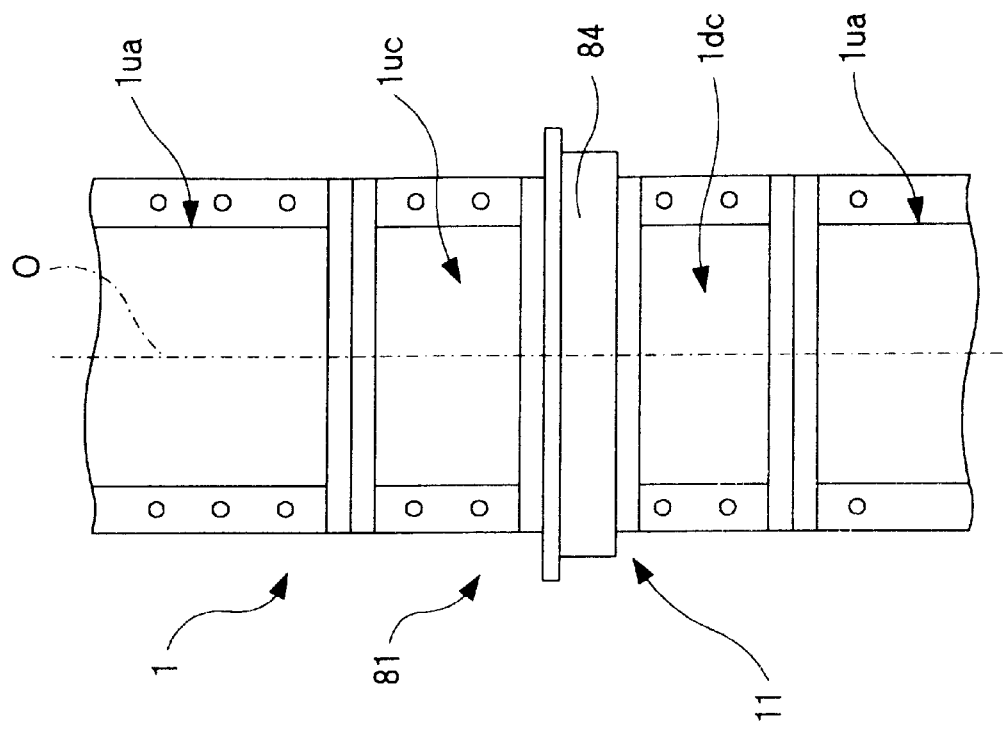
FIGS. 21a and 21b are a side sectional view and a rear front view showing the fourth specific example of the auxiliary screw rotating device.
Figure 21A:
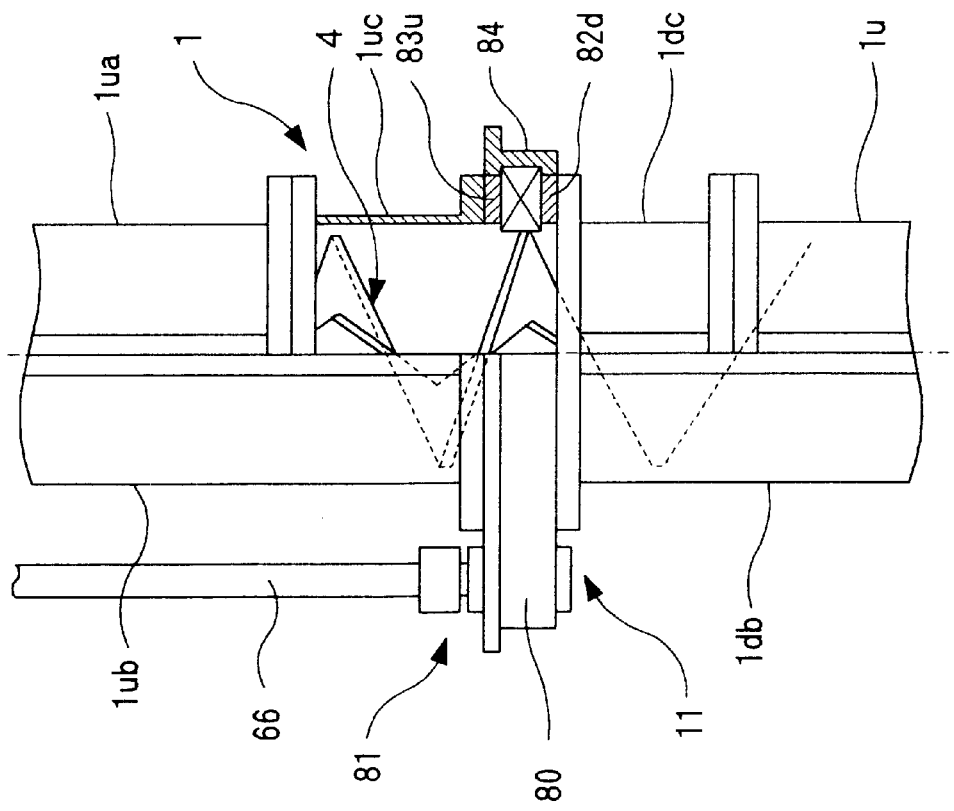

FIGS. 21(a) and 21(b) show a fifth specific example of the auxiliary screw rotating device (however, this is also applicable to the main screw rotating device). This example relates to improvements in the cylindrical casing 1.

The casing is divided in the axial direction to form a plurality of casing pieces, each of which is further divided into two at a plane including the axis O. Thus, half casing pieces 1*ua*, 1*da*, 1*ub,* and 1*db* are obtained and constitute the cylindrical casing 1. Near a coupled portion supporting a driving rotation ring 213, the half casing pieces 1*ua* and 1*da* are each divided to form opening and closing pieces 1*uc* and 1*dc* respectively. The opening and closing pieces 1*uc* and 1*dc* are each removably connected to a flange portion via mounting bolts. Thus, maintenance operations such as inspection of the coupled portions and replacement of worn-out parts can be easily performed without the need to remove the opening and closing pieces.

(Third Embodiment)

Figure 22:
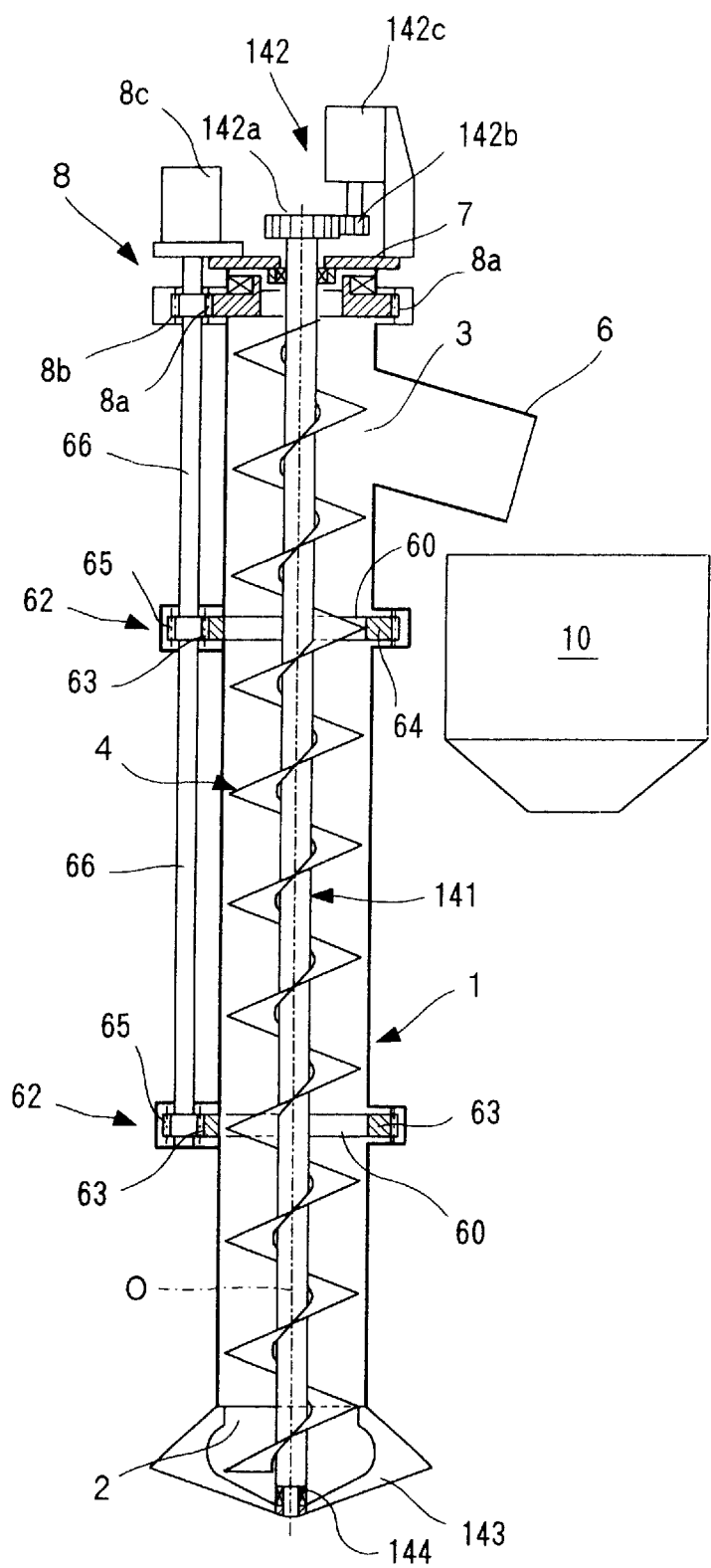
FIG. 22 is a general side sectional view showing a third embodiment of the screw conveyor apparatus according to the present invention.

According to a third embodiment, the ribbon screw 4 of the second embodiment has a central shaft 141 disposed in a hollow portion thereof as shown in FIG. 22.

The central shaft 141, rotatably arranged in the hollow portion of the ribbon screw 4 on the axis O of the casing 1 so as to form a predetermined gap from the ribbon screw 4, has its upper end supported by the upper end of the casing 1 via a central-shaft rotating device 142 and has its lower end supported by a scraping blade (support member) 143 via a bearing 144, the scraping blade 143 attached to the casing 1 to guide conveyed materials (sediments). The central shaft 141 is supported by the upper end member 7 via an inner bearing 142 (?) so as to be rotatable around the axis O, and is rotationally driven by a passive gear 142*a* of the central-shaft rotating device 142, a drive pinion 142*b* that meshes with the passive gear 142*a,* and a central-shaft rotational drive device (hydraulic or electric motor) 142*c* that rotationally drives the drive pinion 142*b*. Further, the scraping blade 143 supports the lower end of the central shaft 141 via the lower-end bearing 144, thereby effectively preventing the central shaft 141 from being twisted or deformed.

Figure 23:
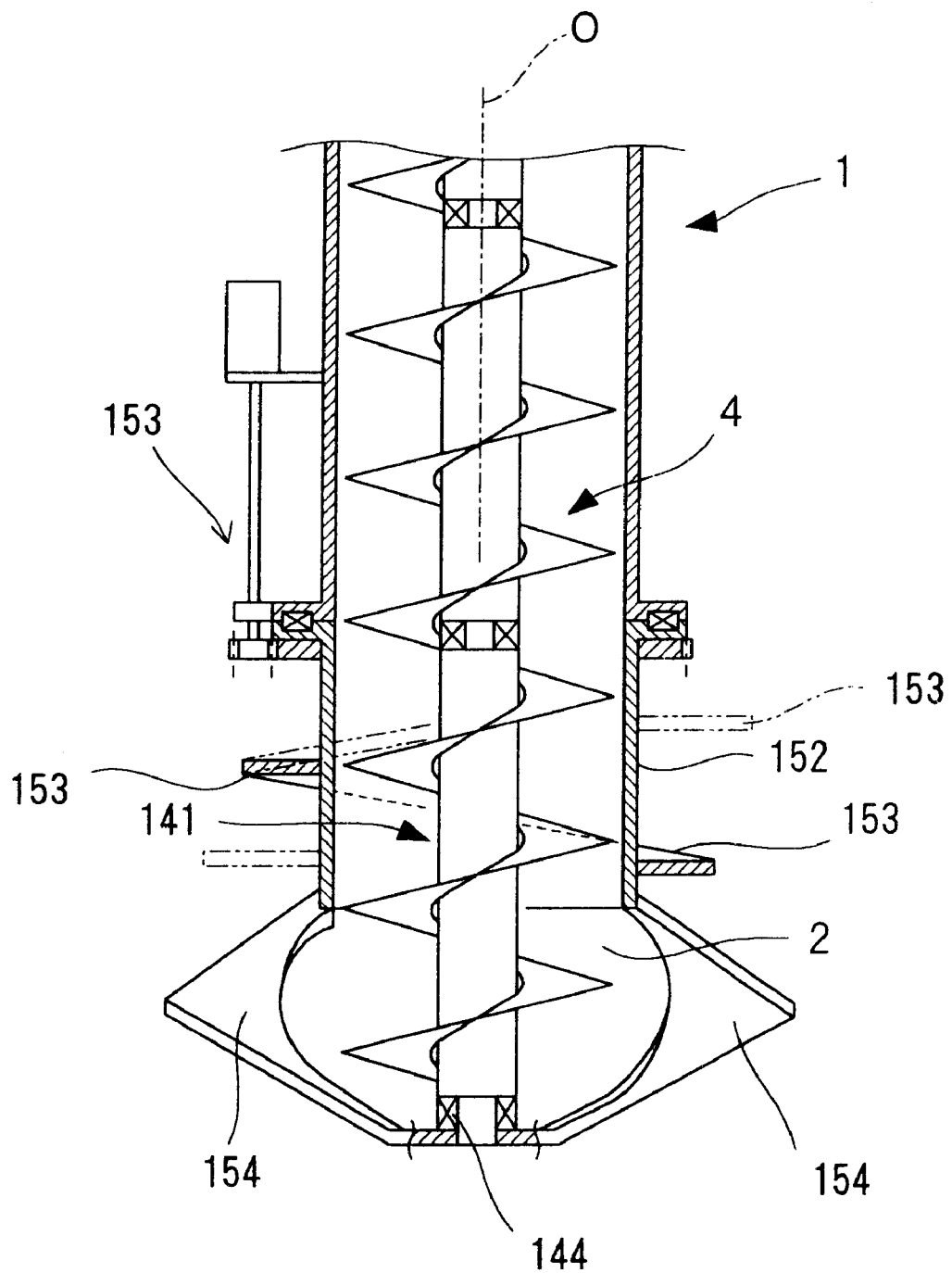
FIG. 23 is a side sectional view showing a variation of the screw conveyor apparatus, having a scraping member in a lower part of the casing.

In this regard, as shown in FIG. 23, the casing 1 may have a rotating casing 152 provided at its lower end and rotated by a rotational drive device 151, and the rotating casing 152 may have a scraping member 153 attached to a shell portion thereof. Further, a scraping blade 154 may be provided between the rotating casing 152 and the central shaft 141.

Alternatively, the central shaft 141 may be fixed.

According to the above embodiment, the ribbon screw 4 has the central shaft arranged in the hollow portion thereof to improve the conveyance capability of the ribbon screw 4. Furthermore, the central shaft 141 is rotated in the direction opposite to the rotating direction of the ribbon screw 4 slowly, so that the frictional force between the outer peripheral surface of the central shaft 141 and sediments prevents the together rounding phenomenon in which the sediments pivotally moves in the rotating direction of the ribbon screw 4, thus allowing the sediments to be efficiently conveyed.

(Fourth Embodiment)

Figure 24:
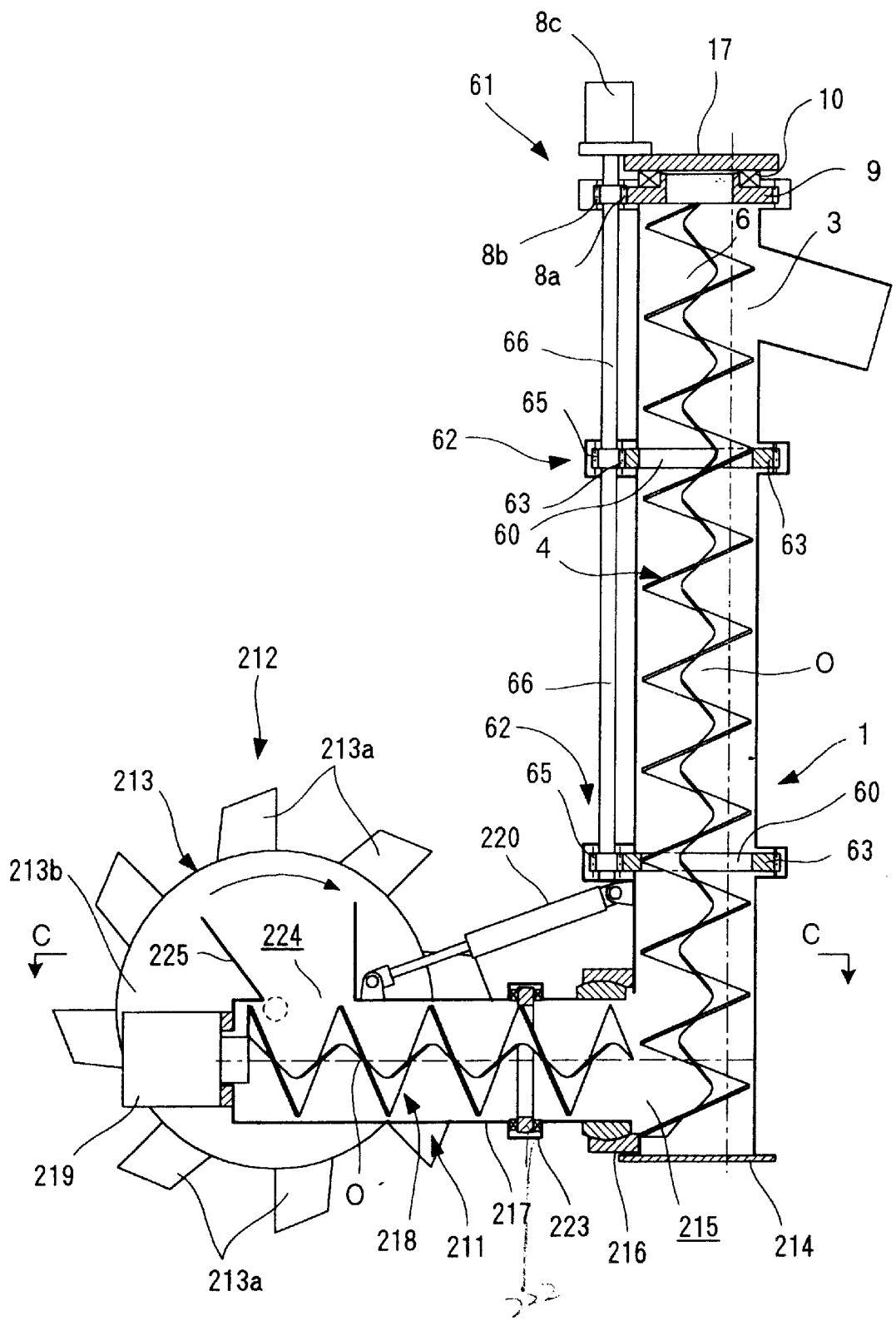
FIG. 24 is a general side sectional view showing a fourth embodiment of the screw conveyor apparatus according to the present invention.
Figure 25:
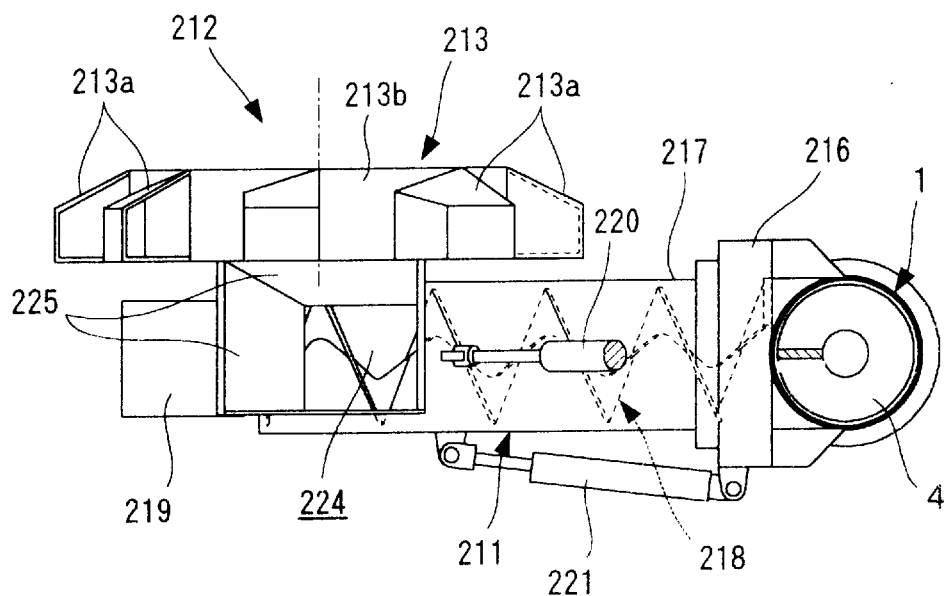
FIG. 25 is a sectional view taken along a line C—C, shown in FIG. 24.
Figure 26:
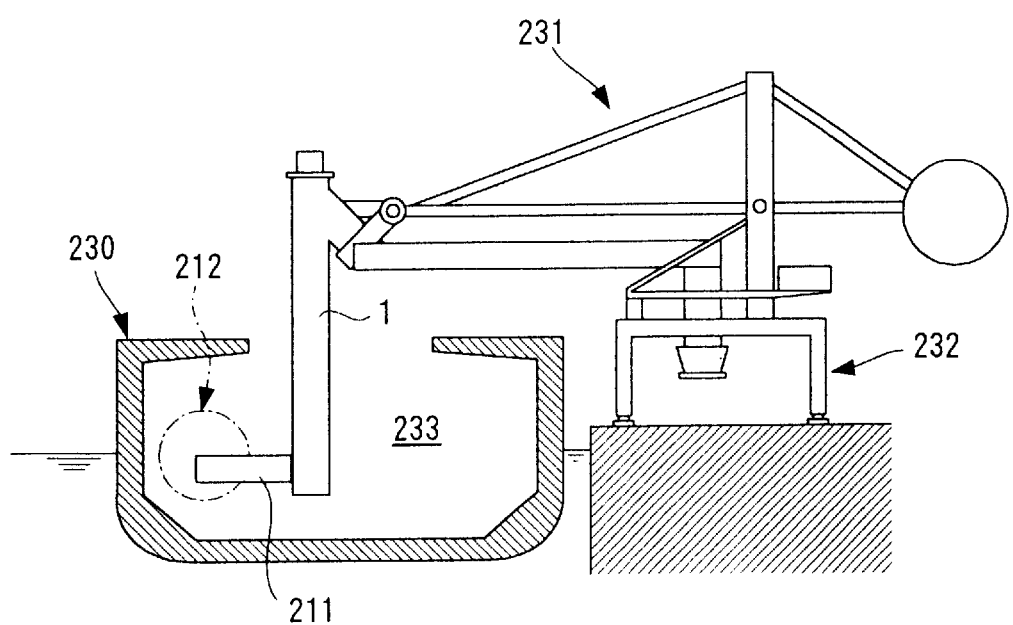
FIG. 26 is a side view showing how the apparatus is operated.

FIGS. 24 to 26 show a fourth embodiment in which conveyed materials are grains or coals. In this embodiment, the screw conveyor in the second embodiment in FIG. 10 includes a reclaimer device (loading means) 212 having a loading screw conveyor (supply means) 211 that forcibly pushes the conveyed materials into the lower end of the cylindrical casing 1, and for example, a bucket wheel 213 that scrapes up the conveyed materials. The reclaimer device may be another scraping device.

That is, the cylindrical casing 1 has its lower end closed by a blocking plate 214, and has a loading opening 215 formed in its side and close to the lower end. A cylindrical loading casing 217 of the loading screw conveyor 211 is fitted on the loading opening 215 via a spherical bearing 216 so as to extend in the direction orthogonal to the axis O and to oscillate within a predetermined angle. The loading casing 217 has its proximal end connected to the spherical bearing 216, and has a loading ribbon screw 218 arranged therein so as to be rotatable around a second axis O'. The loading ribbon screw 218 is provided with an outer peripheral supporting section 223 to support a rotation ring 222 externally fittingly fixed to the proximal end of the loading ribbon screw 218 via the seal member and the bearing as needed. The loading ribbon screw 218 has its tip coupled to an output shaft of a loading screw rotation driving device 219 provided on the loading casing 217 so that the loading ribbon screw 118 is rotatably supported and rotationally driven. Further, a vertical oscillation device (hydraulic cylinder) 220 that oscillates the loading screw conveyor 211 in the vertical direction and a lateral oscillation device (hydraulic cylinder) 221 are coupled between the cylindrical casing 1 and the loading casing 217.

The reclaimer device 212 has a bucket wheel 213 supported on one side of the tip of the loading screw conveyor 211 so as to be rotatable around a horizontal axis orthogonal to the axis O' of the loading casing 215. The bucket wheel 213 has scraping buckets 213*a* attached to an outer peripheral portion of a cylindrical body 213*b* at specified intervals, and is rotationally driven in the direction of the arrow in the drawing by a wheel driving device (not shown). Further, the loading casing 217 has a loading port 224 opened in the top surface of its tip, and a chute 225 that guides conveyed materials dropped through the buckets 213*a,* to the loading port 224.

Figure 27:
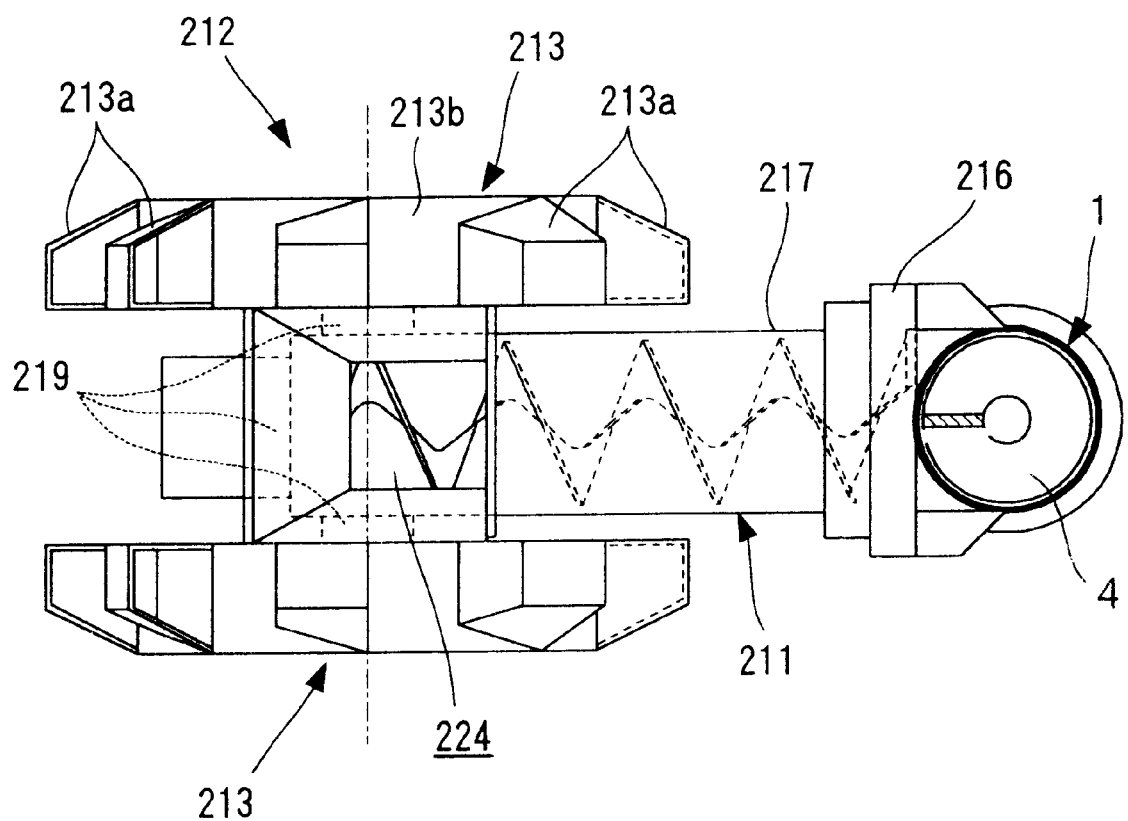
FIG. 27 is a plan sectional view showing a variation of the fourth embodiment.

Of course, as shown in the variation in FIG. 27, the bucket wheel 213 may be provided at both sides of the loading screw conveyor 211.

As shown in FIG. 26, the above screw conveyor apparatus is used as, for example, a lifting and collecting facility 231 that unloads conveyed materials such as ores or grains from a large carrying vessel 230. The above screw conveyor apparatus is provided on a running gateway crane apparatus 232 installed on an unloading quay or the like so as to run freely. Then, the bucket wheel 213 of the reclaimer device 212 provided at the lower end of the cylindrical casing 1 via the loading screw conveyor 211 is used to scrape up conveyed materials in a corner of a hold 233 to allow the materials to be unloaded easily and promptly. In the above description, the loading means comprises the reclaimer device 212, but may be a backhoe, a belt conveyor device, or the like.

Figure 28A:
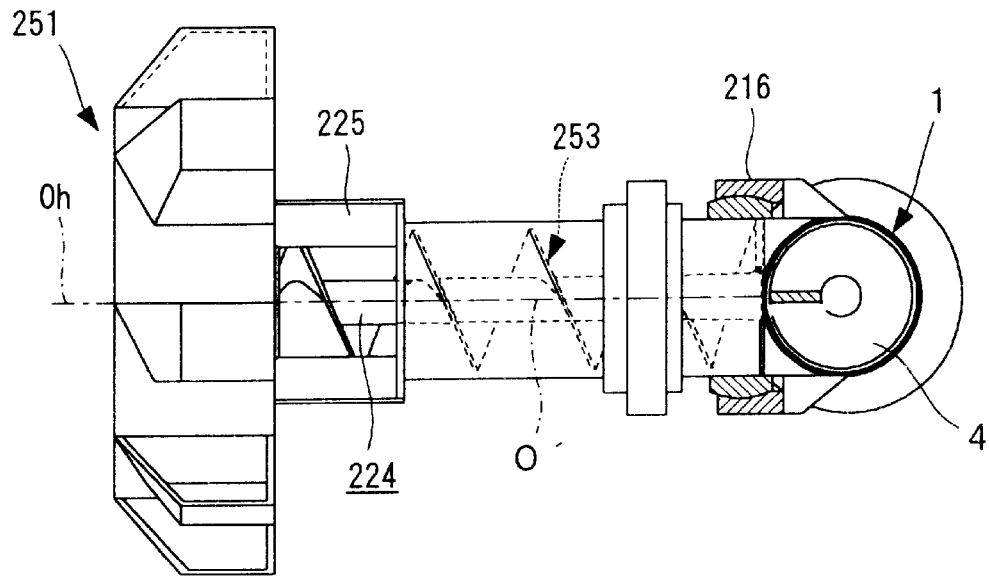
FIGS. 28a and 28b are a plan sectional view and a side front view showing another variation of the fourth embodiment.
Figure 28B:
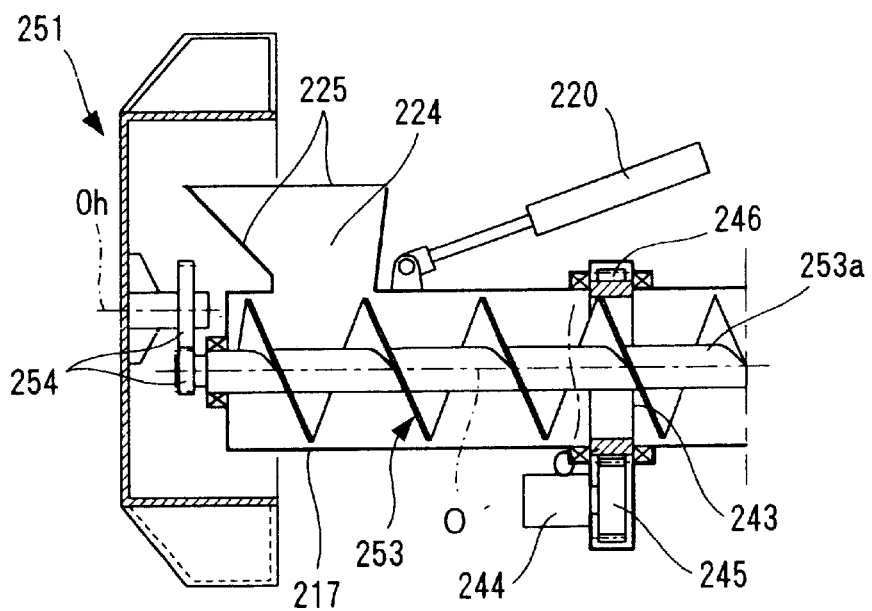

FIGS. 28(a) and 28(b) show other variations of the reclaimer device 212 and the loading screw conveyor 211 in which the mounting direction of the bucket wheel 213 is changed.

That is, a bucket wheel 251 of the reclaimer device 212 is arranged so as to be rotatable around an axis Oh parallel with the axis O' of the loading casing 217, and f is integrally rotationally driven by a loading drive motor 244.

The loading casing 217 has a loading shafted screw 252 arranged therein, and a shaft portion 253a of the loading shafted screw 253 protruding from the loading casing 217 and the bucket wheel 251 are coupled and interlocked together by a gear mechanism 254. Of course, the bucket wheel 251 and the loading shafted screw 253 may be driven by separate devices.

In addition to the effects of the above described embodiment, the second embodiment has the following effects: The cylindrical casing 1 has the reclaimer device 251 arranged at its lower end via the loading screw conveyor 211, thereby enabling conveyed materials such as grains to be smoothly unloaded from the hold 233 of the large carrying vessel 230. Consequently, the conveyed materials can be easily scraped up in a corner of the hold 233 to complete the unloading operation in a short time.

Further, the cylindrical casing 1 is provided with the loading screw conveyor 211 via the spherical bearing 216, so that the vertical oscillation device 220 and the lateral oscillation device 221 allow the bucket wheels 213 and 252 to be turned in an arbitrary direction to efficiently take in the conveyed materials. At this time, the entire screw conveyor apparatus may be turned around the axis O of the cylindrical casing 1 to displace the bucket wheel 213 or 252.

Additionally, in the above embodiments, the casing 1 is cylindrical, but may be polygonal.

Industrial Applicability

As described above, the present invention is suitable to a screw conveyor which conveys plastic materials or grains along a steep slope up to a high position and in particular, which is extended long on the same axis.

What is claimed is:

1. A screw conveyor apparatus for a steep slope and a large lifting height, having a ribbon screw disposed in a cylindrical casing so as to be rotatable around an axis of the ribbon screw, characterized by comprising:

rotation rings fixedly fitted over said ribbon screw at predetermined positions in an axial direction of the ribbon screw;

outer peripheral supporting sections provided in said casing and supporting said rotation rings to be rotatable;

a main screw rotating device provided at a predetermined position of said casing to rotationally drive said ribbon screw; and an auxiliary screw rotating device provided for at least one of said outer peripheral supporting sections to rotationally drive said ribbon screw via the rotation rings.

2. The screw conveyor apparatus for a steep slope and a large lifting height according to claim 1, characterized by further comprising:

casing pieces formed by dividing the casing into a plurality of pieces in the axial direction in correspondence to the outer peripheral supporting sections;

support rings attached to said respective connected ends of said casing pieces;

rotation rings each rotatably supported between the support rings via a seal portion;

a bearing housing provided between both said support rings to cover the rotation ring; and an auxiliary screw rotating device provided in the bearing housing, said-device comprising a drive pinion meshing with a passive gear provided on the rotation ring and a rotational drive device for rotationally driving the drive pinion.

3. The screw conveyor apparatus for a steep slope and a large lifting height according to claim 1, characterized in that the ribbon screw is formed by connecting a plurality of screw pieces together in the axial direction, the screw pieces each has a recess and a projection formed at respective connected ends thereof, said recess and projection being capable of engaging with each other in a screw surface so that said screw pieces can be freely connected together and separated from each other, and coupling members are provided for coupling said screw together using said recesses and projections.

4. The screw conveyor apparatus for a steep slope and a large lifting height according to claim 1, characterized in that the ribbon screw is formed by connecting a plurality of screw pieces together in the axial direction, said screw pieces having connected ends each cut at a traverse surface perpendicular to the axis, with connection rings fixedly fitted over the respective cut portions, said connection rings are connected together to connect the screw pieces together, and integrated connection rings obtained by coupling said connection rings together form outer peripheral supporting sections supported on the casing to be rotatable around the axis so as to support the ribbon screw on the casing.

5. The screw conveyor apparatus for a steep slope and a large lifting height according to claim 1, characterized in that the ribbon screw is formed by connecting a plurality of screw pieces together in said axial direction via coupling pieces, said coupling pieces are fixed to the rotation rings via coupling means, a recess and a projection are formed in ends of said coupling pieces and in connected ends of said screw pieces, said recess and projection being capable of engaging with each other in a screw surface, and said screw pieces and said coupling pieces are continuously connected together along said screw surface at a same inclination.

6. The screw conveyor apparatus steep slope and a large lifting height according to claim 1, characterized in that the ribbon screw is formed by connecting a plurality of screw pieces together in the axial direction via coupling pieces, said coupling pieces are fixed to the rotation rings via coupling means, a recess and a projection are formed in ends of said coupling pieces and in connected ends of said screw pieces, said recess and projection being capable of engaging with each other in a screw surface, said screw pieces and said coupling pieces are continuously connected together along said screw surface at a same inclination, and said coupling means comprises a notched portion formed at a predetermined position of the ribbon screw corresponding to an inner surface of the rotation ring, a mounting piece capable of fitting in and removing from said notched portion, a fixing member fitting said mounting piece in the notched portion to fix the mounting piece to the coupling piece, and a welded portion joining said mounting piece to the rotation ring.

7. The screw conveyor apparatus for a steep slope and a large lifting height according to claim 1, characterized in that an axial width of the rotation ring protruding into the casing is in a range of 0.05 to 0.6 times and outer diameter of the screw.

8. The screw conveyor apparatus for, a steep slope and a large lifting height according to claim 1, characterized in that a loading screw conveyor is connected to a lower end of the casing, and loading means is provided as a tip portion of the loading screw conveyor to collect and supply conveyed materials to the loading conveyor.

9. The screw conveyor apparatus for a steep slope and a large lifting height according to claim 1, characterized in that a loading screw conveyor is connected to a lower end of the casing, loading means is provided at a tip portion of the loading screw conveyor to collect and supply conveyed materials to the loading conveyor, and the loading means is composed of a reclaimer device having bucket wheel driven to rotate around a predetermined axis.

* * * * *